United States Patent
Specht et al.

(10) Patent No.: US 10,311,077 B2
(45) Date of Patent: Jun. 4, 2019

(54) DATABASE TABLE CONVERSION

(71) Applicant: SAP SE, Walldorf (DE)

(72) Inventors: Juergen Specht, Gerabronn (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 303 days.

(21) Appl. No.: 14/920,362

(22) Filed: Oct. 22, 2015

(65) Prior Publication Data

US 2017/0116296 A1   Apr. 27, 2017

(51) Int. Cl.
G06F 17/20   (2006.01)
G06F 16/25   (2019.01)
G06F 16/21   (2019.01)

(52) U.S. Cl.
CPC .......... *G06F 16/258* (2019.01); *G06F 16/214* (2019.01)

(58) Field of Classification Search
CPC ....................................................... G06F 17/30
See application file for complete search history.

(56) References Cited

U.S. PATENT DOCUMENTS

| 5,926,810 | A * | 7/1999 | Noble | G06F 17/30569 707/999.002 |
| 2010/0138821 | A1* | 6/2010 | Driesen | G06F 8/65 717/168 |
| 2012/0041933 | A1* | 2/2012 | Driesen | G06F 17/303 707/702 |
| 2012/0324436 | A1* | 12/2012 | Milenovic | G06F 8/67 717/170 |
| 2014/0143263 | A1* | 5/2014 | Ritter | G06F 17/30303 707/756 |
| 2017/0161291 | A1 | 6/2017 | Specht et al. | |

OTHER PUBLICATIONS

"U.S. Appl. No. 14/958,197, Non Final Office Action dated May 10, 2018", 18 pgs.

* cited by examiner

*Primary Examiner* — Khanh B Pham
(74) *Attorney, Agent, or Firm* — Schwegman Lundberg & Woessner, P.A.

(57) ABSTRACT

Methods, systems, and computer program products for converting a database table and implementing upgrades and/or migrations are described. A bridge schema comprising a bridge view for a table in a database of an original schema is created and a bridge application server instance is created, the bridge application server instance configured to utilize the bridge schema to access the table of the original schema. The table of the original schema is revised to conform to a specified target schema and a target application server instance configured to access the revised table is created.

20 Claims, 21 Drawing Sheets

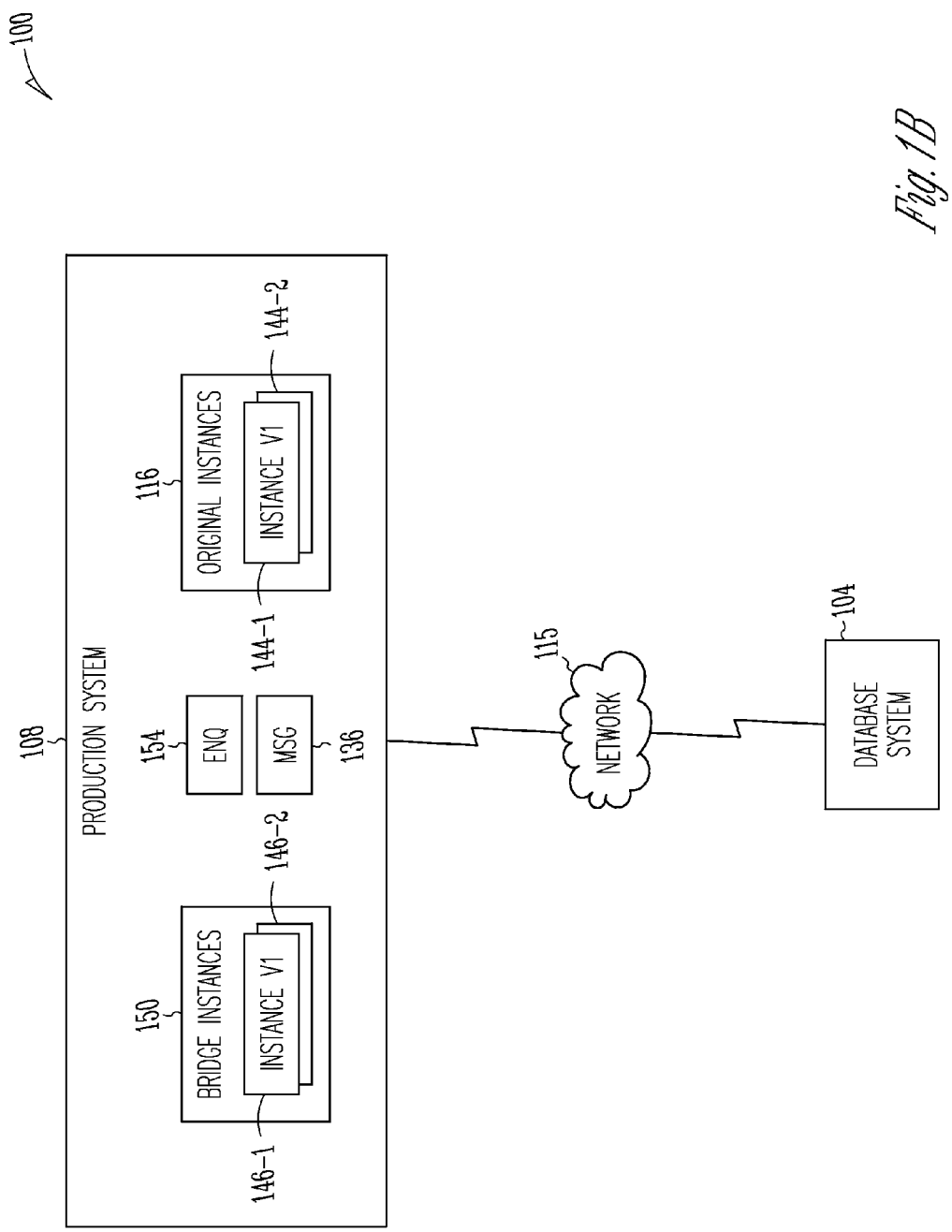

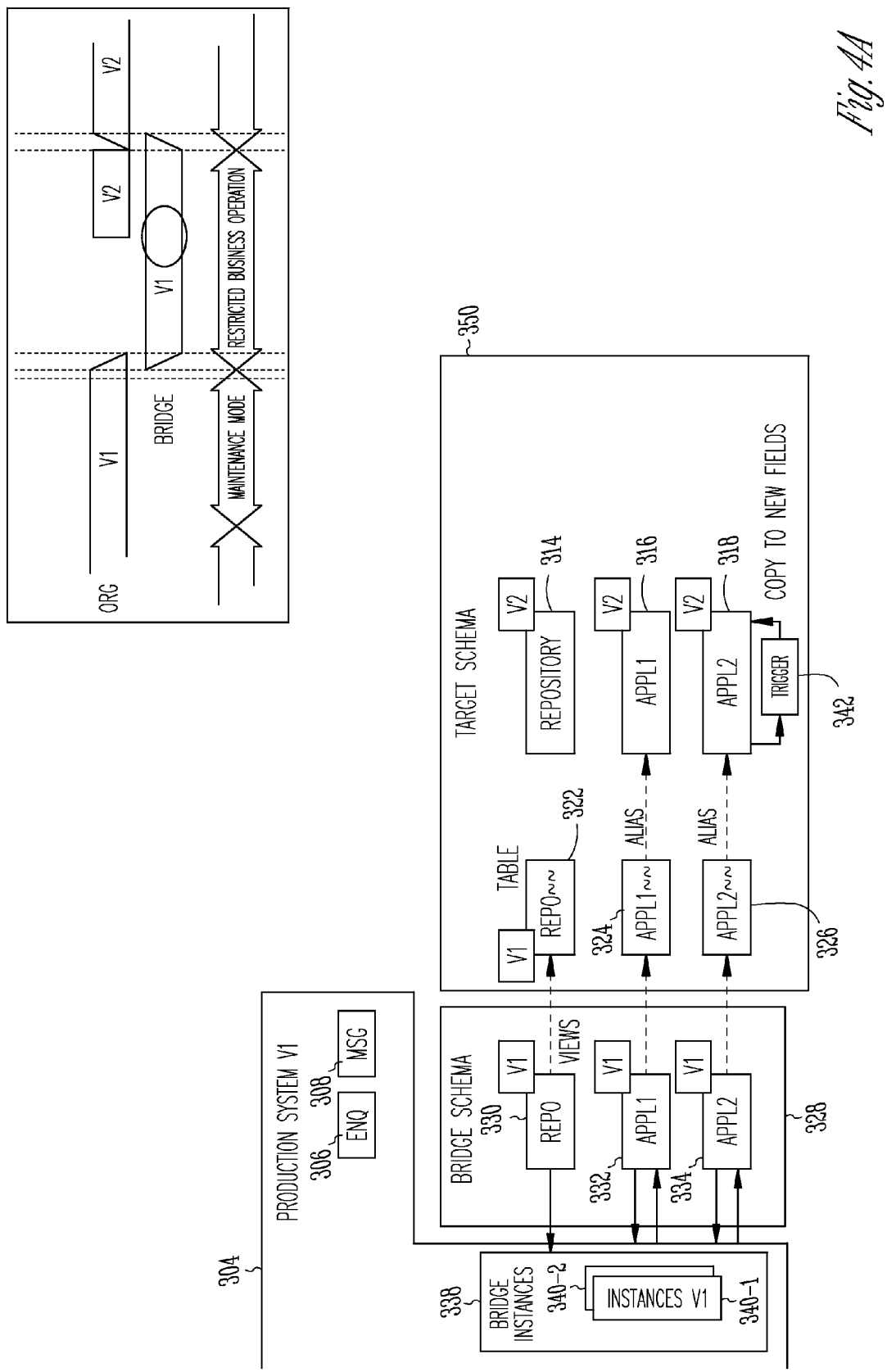

DATABASE TABLE CONVERSION

FIELD

The present disclosure relates generally to database tables. In an example embodiment, the disclosure relates to a mechanism for revising database tables.

BACKGROUND

Database tables are widely used in the operations of applications, such as business applications. The database tables often need to be revised to accommodate different data types in their fields and/or to add new fields. For example, currency fields may need to be lengthened to accommodate inflation. Material and order number fields may need to be lengthened to accommodate transaction counts that evolve from thousands to millions.

In some cases, it may prove difficult to extend the length of a field type. For example, the character data type "NUMC" is only filled with numbers; the numbers are right aligned and the field is filled with "0" characters from the left side. In some instances, it may be necessary to copy the complete table to a new version of the table in order to incorporate a longer field for the cited data type, and to transfer the data using an application level program. In the case of the "NUMC" data type, the program reads the old value, creates a new value which is filled with "0" characters from the left side, and the old value is appended to make the new number right aligned again and filled with the appropriate number of "0" characters from the left side. Thus, extending data types may lead to a "conversion" procedure which creates a new table, copies the data to the new table, and replaces the old table with the new table. The copying of the table may require additional memory (potentially equal to or greater than the size of the table) and may result in prevention of access to the table (i.e., downtime) since write access during the revision process may not be possible.

BRIEF DESCRIPTION OF DRAWINGS

The present disclosure is illustrated by way of example and not limitation in the figures of the accompanying drawings, in which like references indicate similar elements and in which:

FIG. 1B is a block diagram of a production system that is undergoing a software upgrade, in accordance with an example embodiment;

FIGS. 4A-4C illustrate the logical diagram of a production system during a rollback procedure, in accordance with an example embodiment;

DETAILED DESCRIPTION

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for a conversion mechanism that converts (i.e., revises) a database table and a migration mechanism that is utilized to implement software system upgrades and/or migrations are described. In one example embodiment, a new table is created with a new structure that incorporates a defined change(s) to an existing table. The defined change may be the addition of a new field, or a change to an existing field, such as a change of data type, a change to the length of the field, and the like.

In one example embodiment, the data is read from the existing table, and stored in a new table that comprises the new field(s) and/or revised field(s). The old table is then removed and the name of the new table is changed to match the name of the previously existing table. In one example embodiment, a table may be modified without creating a duplicate table. One or more new fields are appended to the existing table, where each new field corresponds to an existing field that needs to be converted or an additional field that needs to be added. Each new field has a new name and has a structure that corresponds to the desired structure of the converted or additional field. After the new field is created, the new field is populated with the appropriate data. For fields undergoing conversion, the previously existing field is deleted and the name of the new field is changed to match the name of the previously existing field.

Figure 1A:
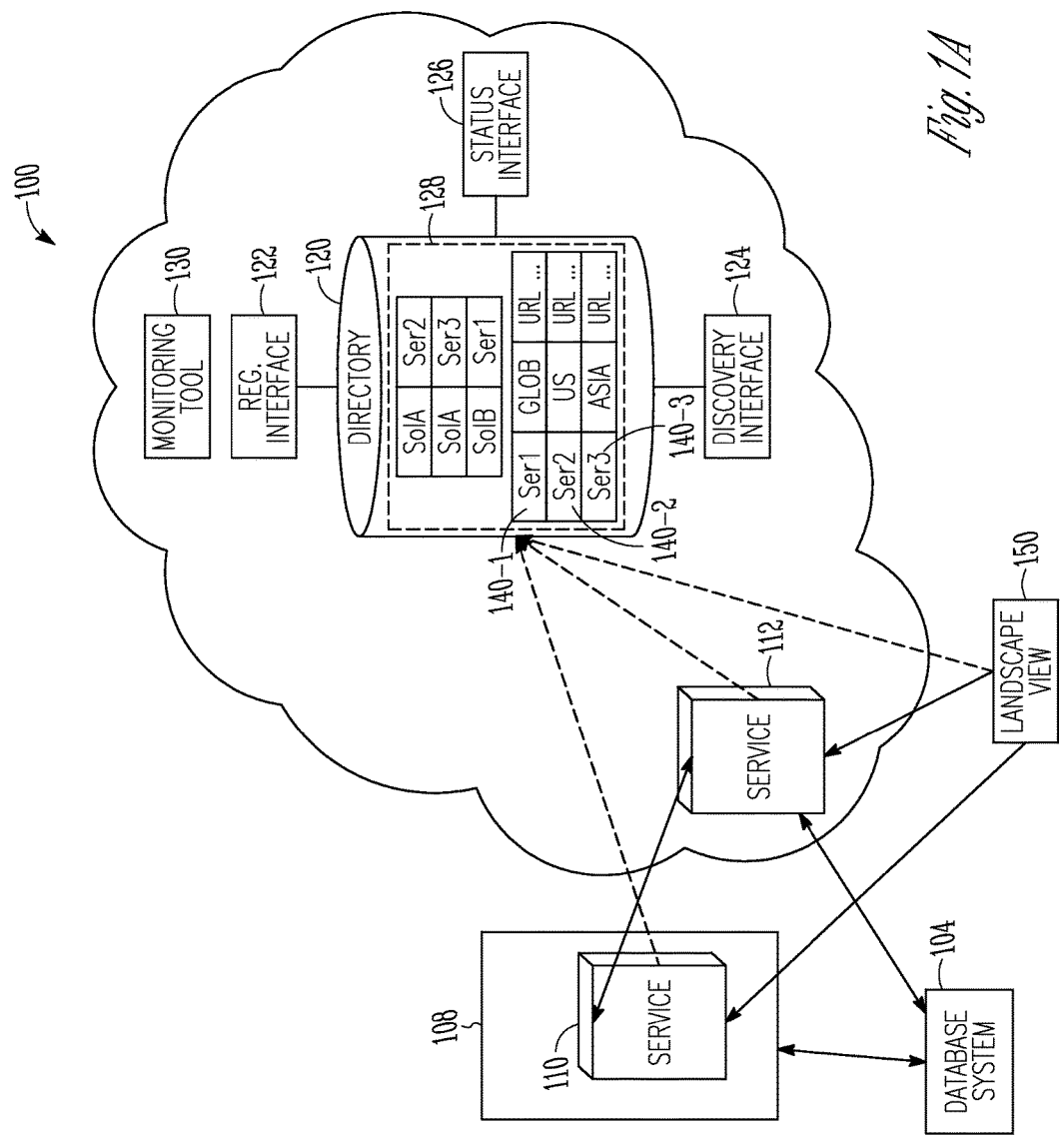
FIG. 1A illustrates a schematic diagram of an example system comprising networked services and a landscape directory, in accordance with an example embodiment.

FIG. 1A illustrates a schematic diagram of an example system 100 comprising a database system 104, a production system 108, networked services 110, 112 and a landscape directory 120, in accordance with an example embodiment. The production system 108 hosts various applications, such as business applications. The applications may include multiple service applications (also referred to as "networked services"), such as networked services 110, 112 that may be distributed over a network and may be accessed by customers to process customers' requests and tasks. The networked services 110, 112 may be hosted by multiple distributed servers that are interconnected via a network (such as the public Internet, private networks, virtual private networks, and the like). The networked services 110, 112 may be on-demand applications (e.g., applications that levy a charge based on use of the applications by customers), or conventional distributed applications for which customers may have licenses. In one example embodiment, at least one of the service applications (e.g., service application 112) may be a cloud-based application configured for cloud processing and may be available for use by multiple customers. In one example embodiment, at least one application (e.g., networked service 110) may be an on-premise application executing, for example, on a private network (which may be part of the cloud or separate from the cloud). Although two networked services 110, 112 are depicted in FIG. 1A, any number of service applications may be used.

As further depicted in FIG. 1A, the system 100 may include a landscape view 150. The landscape view 150 may be an instance/component of monitoring tools, such as a monitoring tool 130, and may provide a holistic overview of a customer system landscape(s) involved in a cloud solution(s). The landscape view 150 may enable viewing the data maintained in the landscape directory 120. Additional application services may be invoked to get more detailed information about the system landscape(s).

The landscape directory 120 may enable automatic connection of pre-defined and pre-developed components (e.g., components that include other applications and tools) of systems, including customer-specific systems, on-demand systems, and the like. Such system management functionality may be enabled, at least in part, through use of a bundle of interfaces to provide customers access to the customers' shared and private landscape data in the landscape directory 120. Thus, in one example embodiment, the landscape directory 120 may be configured to maintain individual landscape data for various customers, where each landscape defines a customer's individual system, e.g., the identity of a set of applications. For example, landscape data for one customer may define that customer's landscape as including networked services 110, 112, while another customer's landscape data may define that customer's system as including only service application 112. In one example embodiment, the landscape directory 120 may be implemented on one or more storage devices (which may be distributed), and may be managed or controlled by a commercial or customized data management application. The landscape directory 120 may be on premise (and thus may be run from a customer's on-premise system or sub-system) or may be run from an on-demand platform using an application (e.g., a directory software application) as a service in hosted mode.

Landscape data in the landscape directory 120 may also include data that defines the connectivity between various applications, and may define separate connectivity configurations for the various customers that use the identified applications. For example, the landscape data may set which services may communicate with each other (e.g., to transfer data, requests, commands, and the like), whether service applications may automatically initiate peer-to-peer communications with other service applications without seeking a customer's input, and the like.

Landscape data maintained in the landscape directory 120 may further comprise registration information for the various service applications 110, 112, including basic information pertaining to the service applications 110, 112, such as the location of service applications 110, 112 (provided, for example, as a uniform resource locator (URL) and the like), the release version of the service applications 110, 112, the applications' role(s) (e.g., human capital management applications, customer relationship management applications, and the like), usage type (e.g., whether the application is used for testing or in the course of production), price/charge information, and the like. In one example embodiment, registration information for a service application 110 or 112 maintained in the landscape directory 120 may be provided via an interface (e.g., a registration interface 122). The registration information may be provided by the services and/or may be provided, under some circumstances, by the customer(s) (e.g., in situations in which the system to be registered is a test system). In one example embodiment, the registration information may be included in each of the individual landscapes for the various multiple customers where the respective service applications 110, 112 are listed, and/or may be maintained in the landscape directory 120 as a global data record (providing information for the respective applications).

The landscape directory 120 may also be accessed through a discovery interface 124 that enables customers to retrieve information, such as the registration information. Information retrieved via the discovery interface 124 may thus be used by customers to subscribe to additional service applications 110, 112 with respect to service applications 110, 112 whose registration information was retrieved via the discovery interface 124, and to modify and/or edit a customers' landscape data (e.g., add or delete particular service applications 110, 112, change landscape configurations, and the like).

The landscape directory 120 may also maintain access data pertaining to the accessibility of the service applications 110, 112. The access data may be communicated to the landscape directory 120 via, for example, a status interface 126 and/or the registration interface 122. Access data may include, for example, status and availability information for the various service applications 110, 112. Access data may be received from administrators (e.g., an administrator of the cloud, of private networks connected to the cloud, of the service applications 110, 112 available on the cloud, and the like), from the service applications 110, 112 themselves, and/or from customers. Examples of access data may include status/availability information, information as to whether service applications 110, 112 are active, information as to whether downtime is scheduled for any service application 110, 112, lifecycle status information, and other such information. Lifecycle status information may include an indication of whether the service application 110, 112 has been released, is obsolete, has been replaced by another service application 110, 112, and the like.

As shown in FIG. 1A, landscape data, including registration data, access data, and the like, may be arranged in data records that are stored in the customers' (or tenants') individual landscape(s) in the landscape directory 120. For example, the landscape directory 120 may include an example landscape 128 which may include multiple records defining the associated customer's system (any number of records may be included in a given landscape 128). The example landscape 128 may be stored in a logical area in memory allocated to store data for that landscape 128.

For example, FIG. 1A shows three records 140-1 through 140-3 included within the landscape 128 that hold information, such as registration information, for the service applications 110, 112 depicted in FIG. 1A. The record 140-1 may include information such as the identity of the service application 110, namely service 1 (i.e., ser1, the abbreviation for the networked service 110), an indication that the networked service 110, 112 may include region or country-specific data, and information about the location of the networked service 110, 112 (e.g., its URL). In this case, the service application 110 may include data from anywhere in the globe. Any of the records 140-1 through 140-3 may include additional data, including status/availability information, other types of registration information, and the like. Additional information that may be included in at least some of the records 140-1 through 140-3 may be the business usage of the system (e.g., customer relationship management (CRM), or human capital management (HCM) systems).

In one example embodiment, a collection of several callable services may be bundled together to define a solution for which there may be a record in a landscape. Defining a bundle of services in the landscape directory 120 as a solution may enable monitoring customers' systems at a "solution-level" and not just at a "service level."

The database system 104 is an organized collection of data. The data stored in the database system 104 includes tables, schemas, views, queries, and the like. A database management system (DBMS) is a component of the database system 104 and is an application that provides for the capture, maintenance, querying, and analysis of data stored in the database system 104. The DBMS is based on a database model, such as a relational model.

FIG. 1B is a block diagram of the production system 108 that is undergoing a software upgrade, in accordance with an example embodiment. As noted above, the production system 108 hosts various applications, such as the networked service 110.

The network 115 provides connectivity between, for example, the production system 108 and the database system 104. The network 115 may be a local area network (LAN), a wireless network, a metropolitan area network (MAN), a wide area network (WAN), a wireless network, a network of interconnected networks, the public switched telephone network (PSTN), and the like.

During the software upgrade or migration, one or more tables in the database system 104 may be added or revised. One or more bridge application server instances 146-1, 146-2 may be instantiated and the original application server instances 144-1, 144-2 of the production system 108 may be temporarily relieved of their role in accessing the database system 104 while the tables are added or revised. The bridge application server instances 146-1, 146-2 allow applications of the production system 108 (that require access to tables that are undergoing conversion) to continue execution while the tables are added or revised, as described more fully below in conjunction with FIGS. 3A-3I.

An enqueue server (ENQ) 154 provides a service that is used by the application server's work processes to obtain an exclusive lock on objects and records in a corresponding table(s). A process can request a lock on an object and other processes are then prevented from changing the locked object. This service is a singleton in the production system 108 and is shared between the application server instances that have the database connect to the original schema and the instances that have the database connect to a bridge schema. A message server (MSG) 136 provides a service to exchange messages between application server instances, e.g. to start an asynchronous task in another process and for inter-process communication. The message server 136 is a singleton in the production system 108 and is shared between the instances with original and bridge database connect.

Figure 2A:
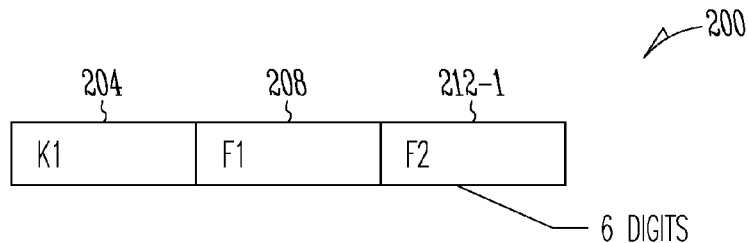
FIGS. 2A-2F show the fields of a table undergoing a conversion process, in accordance with an example embodiment.
Figure 2B:
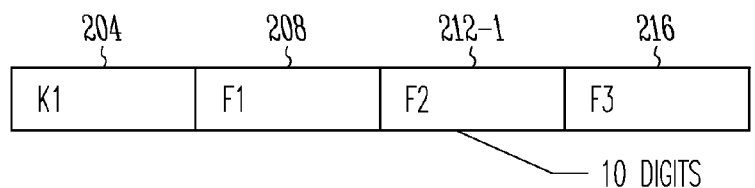
Figure 2C:
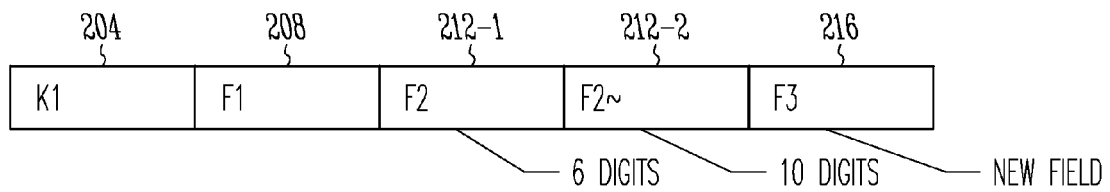

FIGS. 2A-2F show the fields of a table 200 undergoing a conversion process, in accordance with an example embodiment. As illustrated in FIG. 2A, the table 200 comprises a key field 204, a first field 208, and a second field 212-1. The second field 212-1 has a length of six digits. FIG. 2B shows the fields of a target table. The fields of the target table are the same as the table 200, except that the second field 212-1 has a length of ten digits and a third field 216 has been added. In one example embodiment, to create the target table of FIG. 2B, two fields are appended to the table 200 of FIG. 2A, as illustrated in FIG. 2C. New field 212-2 is to be the converted field of field 212-1 and has a length of ten digits; field 216 is the added field of the target table. The field 212-2 is temporarily named, for example, F2~ and field 216 is named, for example, F3.

Figure 2D:
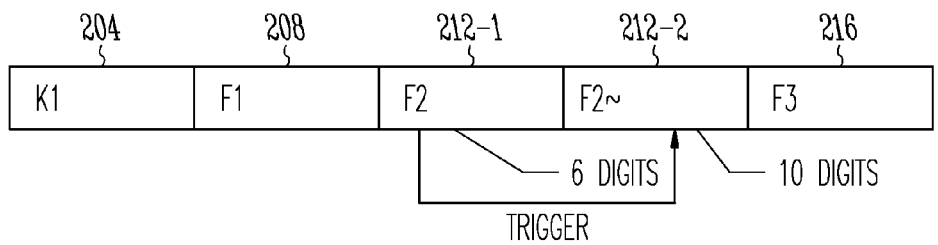
Figure 2E:
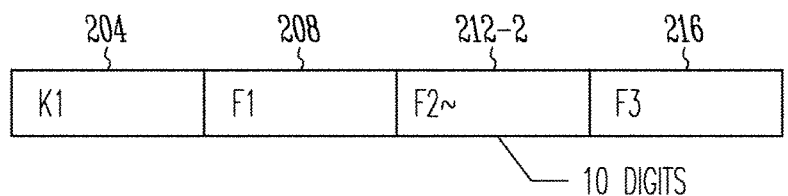
Figure 2F:
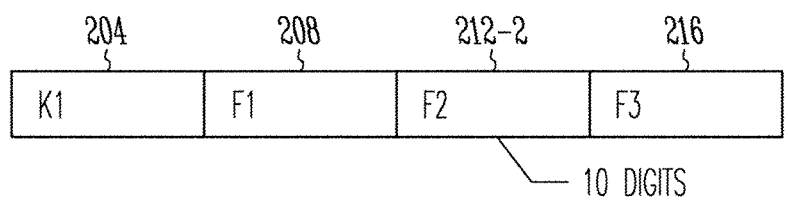

A trigger is created and used to copy the existing data of field 212-1 to the new field 212-2, as illustrated in FIG. 2D. Once the copying of the data is complete, the field 212-1 is dropped from the table, as illustrated in FIG. 2E. The newly converted field 212-2 (of ten digits in length) may then be renamed to the name of the original field 212-1 (i.e., F2), as illustrated in FIG. 2F. The conversion of the table is then complete.

Figure 3A:
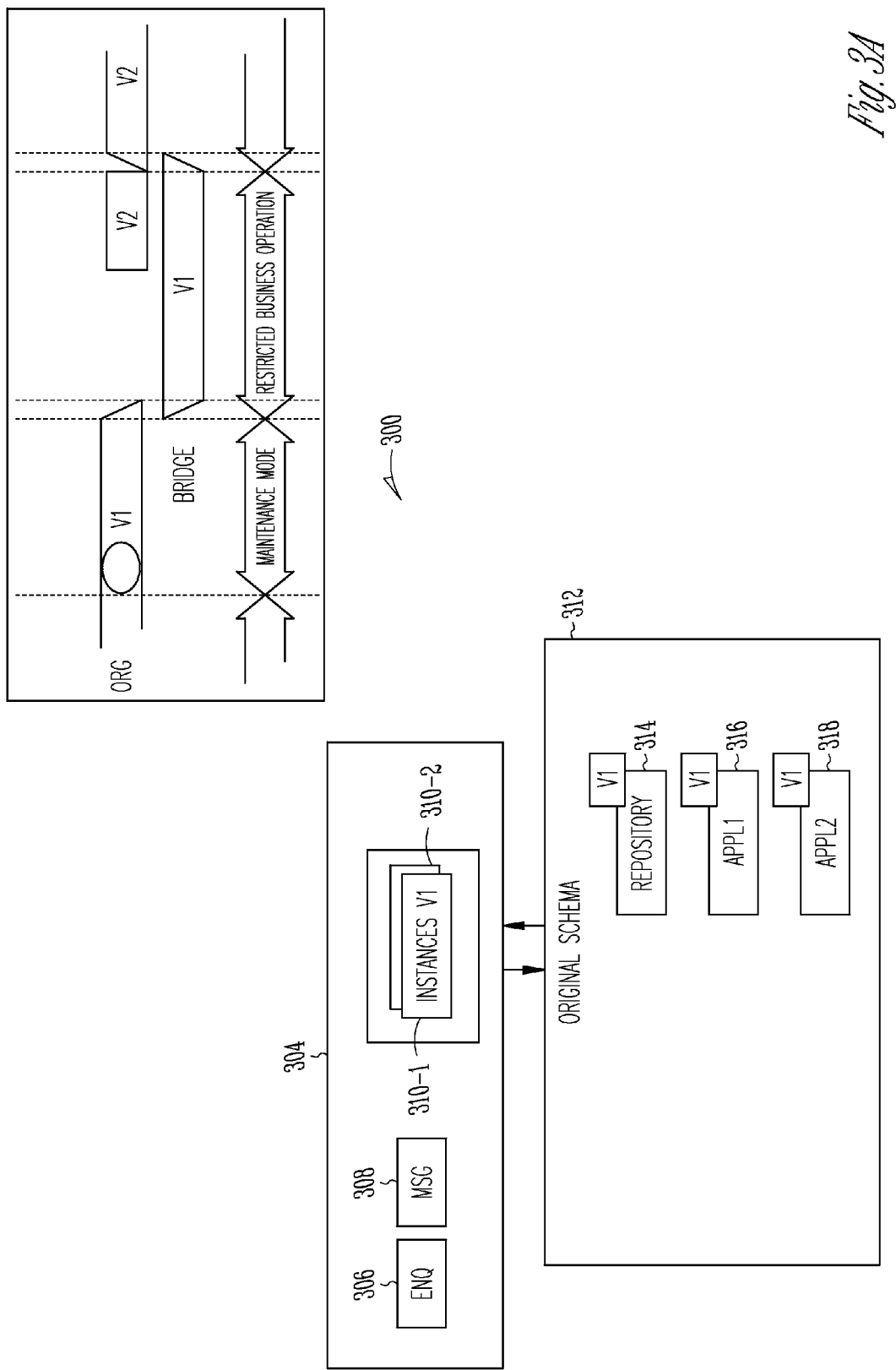
FIG. 3A is a logical diagram of a production system and an original schema prior to a software upgrade process, in accordance with an example embodiment.

FIG. 3A is a logical diagram 300 of a production system 304 and an original schema 312 prior to a software upgrade process, in accordance with an example embodiment. The original schema 312 includes a repository table 314 and two application tables: table Appl1 316 and table Appl2 318. The repository table 314 contains, for example, class files, object code, reports, dictionary definitions, configuration information, and the like. As described above, the production system 304 comprises application server instances 310-1, 310-2 that access the tables Appl1 316 and Appl2 318, respectively. As signified by the v1 legend, the repository table 314, the table Appl1 316, the table Appl2 318, and the application server instances 310-1, 310-2 correspond to a first version of the original schema 312.

The time chart in FIGS. 3A through 3G show the corresponding point in the software upgrade process. As indicated in the time chart of FIG. 3A, the applications of the production system 108 initially use the version 1 tables and views of the original (ORG) schema 312. A maintenance mode is entered where the applications of the production system 108 continue to use the version 1 tables and views of the original schema 312. A transition is then made to the version 1 tables and views of a bridge schema and business operations of the applications are restricted. Once the tables are revised, a transition is made to the version 2 tables and views of a target schema.

Figure 3B:
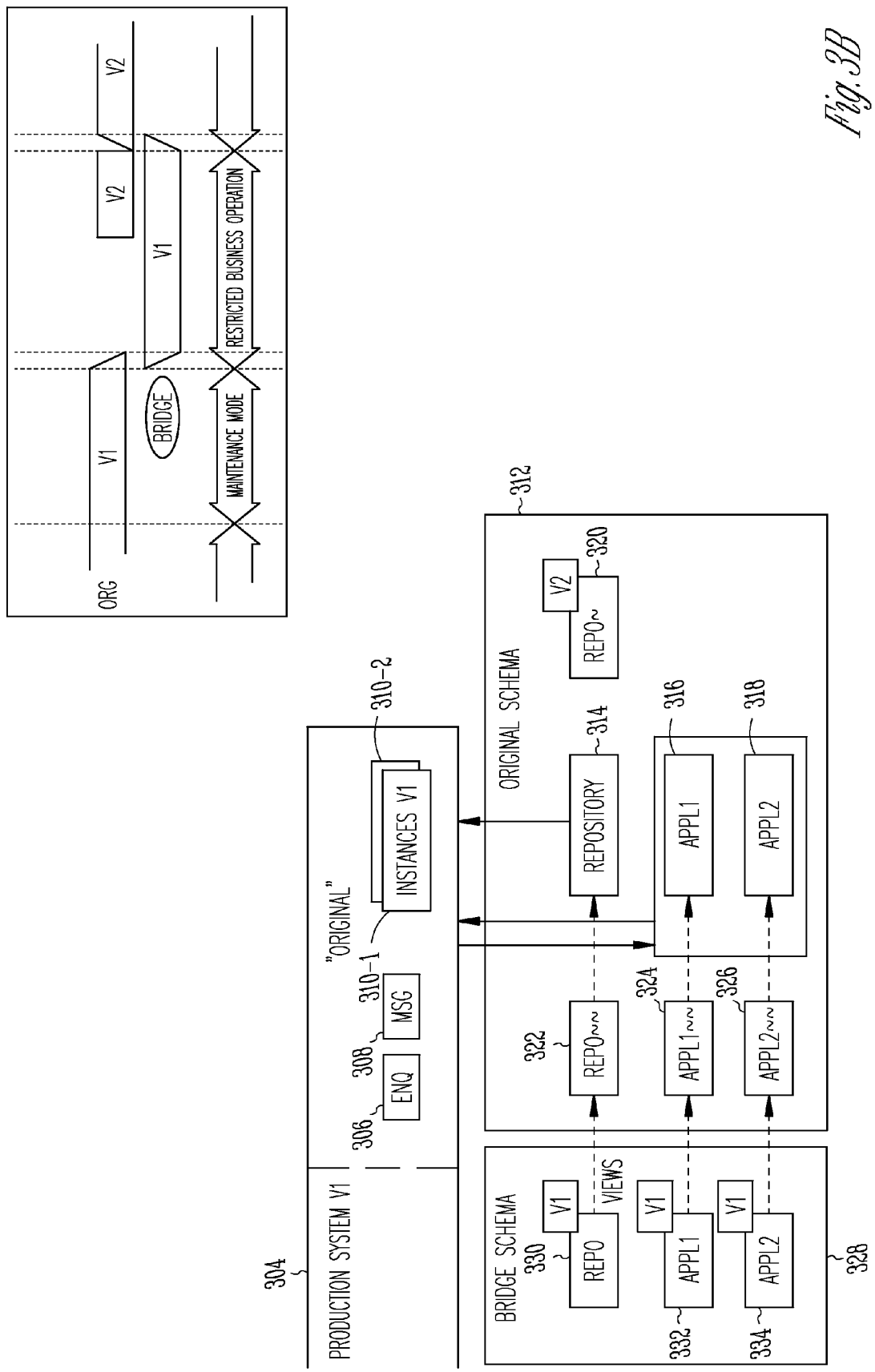
FIG. 3B illustrates the logical diagram of FIG. 3A with the incorporation of a bridge schema, in accordance with an example embodiment.

FIG. 3B illustrates the logical diagram 300 with the incorporation of a bridge schema 328, in accordance with an example embodiment. The bridge schema 328 comprises a view for each table of the original schema 312. For example, the bridge schema 328 comprises a view Repo 330, a view Appl1 332, and a view Appl2 334. The views of the bridge schema 328 access the tables of the original schema 312 via optional aliases within the original schema 312. The aliases include Repo~~ 322 for accessing the repository table 314, Appl1~~ 324 for accessing the table Appl1 316, and Appl2~~ 326 for accessing table Appl2 318. As configured in FIG. 3B, the bridge schema 328 provides access to the tables of the original schema 312 while the tables of the original schema 312 undergo conversion. In addition, a new repository table Repo~ 320 that corresponds to a target schema is created.

Figure 3C:
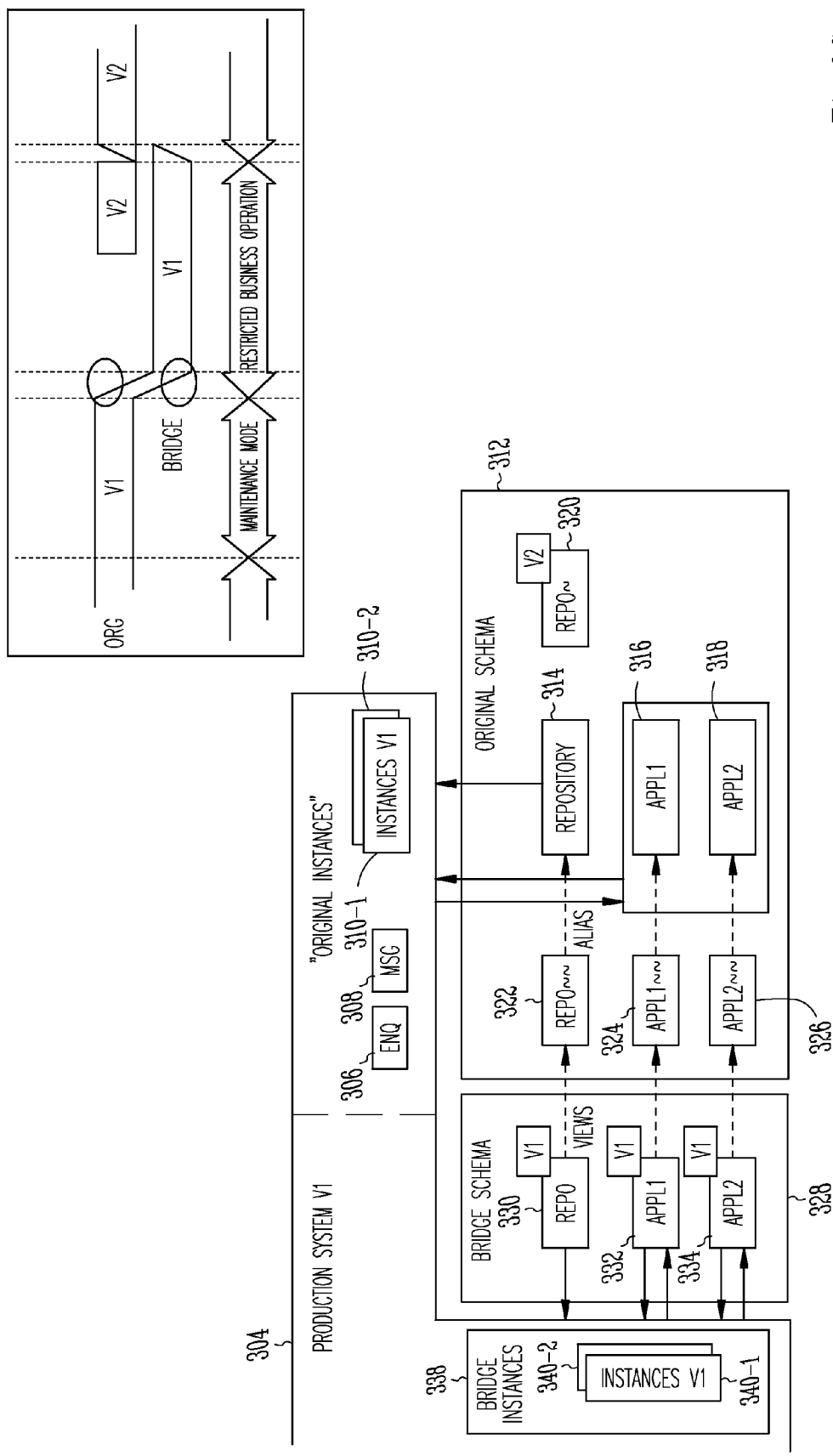
FIG. 3C illustrates the logical diagram of FIG. 3B with the incorporation of bridge application server instances, in accordance with an example embodiment.
Figure 3D:
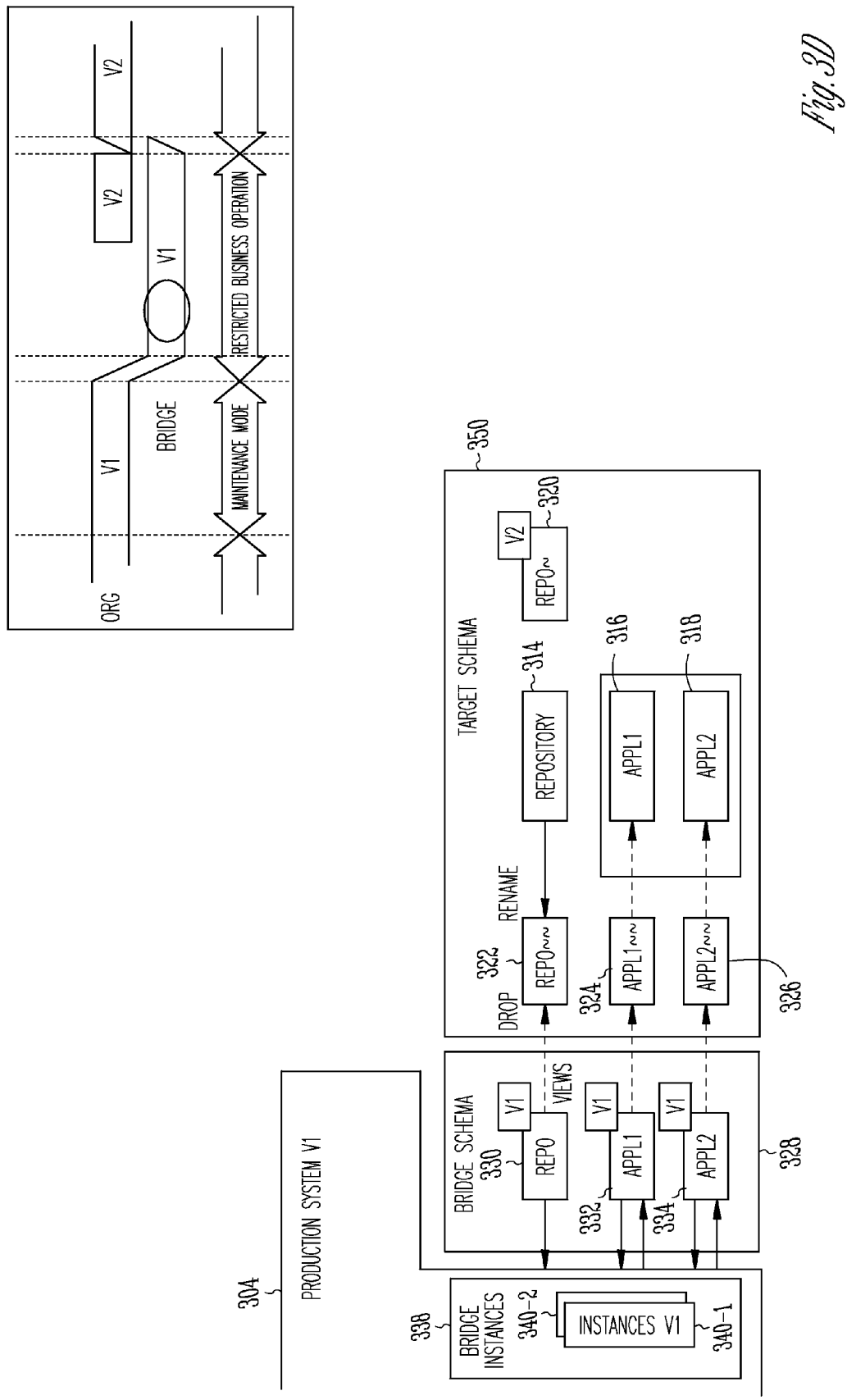
FIG. 3D illustrates the logical diagram of FIG. 3C with the renaming of the repository, in accordance with an example embodiment.

FIG. 3C illustrates the logical diagram 300 with the incorporation of bridge application server instances 340-1, 340-2 in the production system 304, in accordance with an example embodiment. The bridge application server instances 340-1, 340-2 are configured to utilize the bridge schema 328 to access the tables of the original schema 312. A transaction manager configures the applications of the production system 304 to utilize the bridge application server instances 340-1, 340-2 after a database transaction completes in order to ensure a smooth transition from the application server instances 310-1, 310-2 to the bridge application server instances 340-1, 340-2. Once the transition is made to the bridge application server instances 340-1, 340-2, the alias Repo~~ 322 may be dropped and the original repository table 314 may be renamed Repo~~, thereby maintaining access to view Repo 330 and the corresponding repository table 314, as illustrated in FIG. 3D.

Figure 3E:
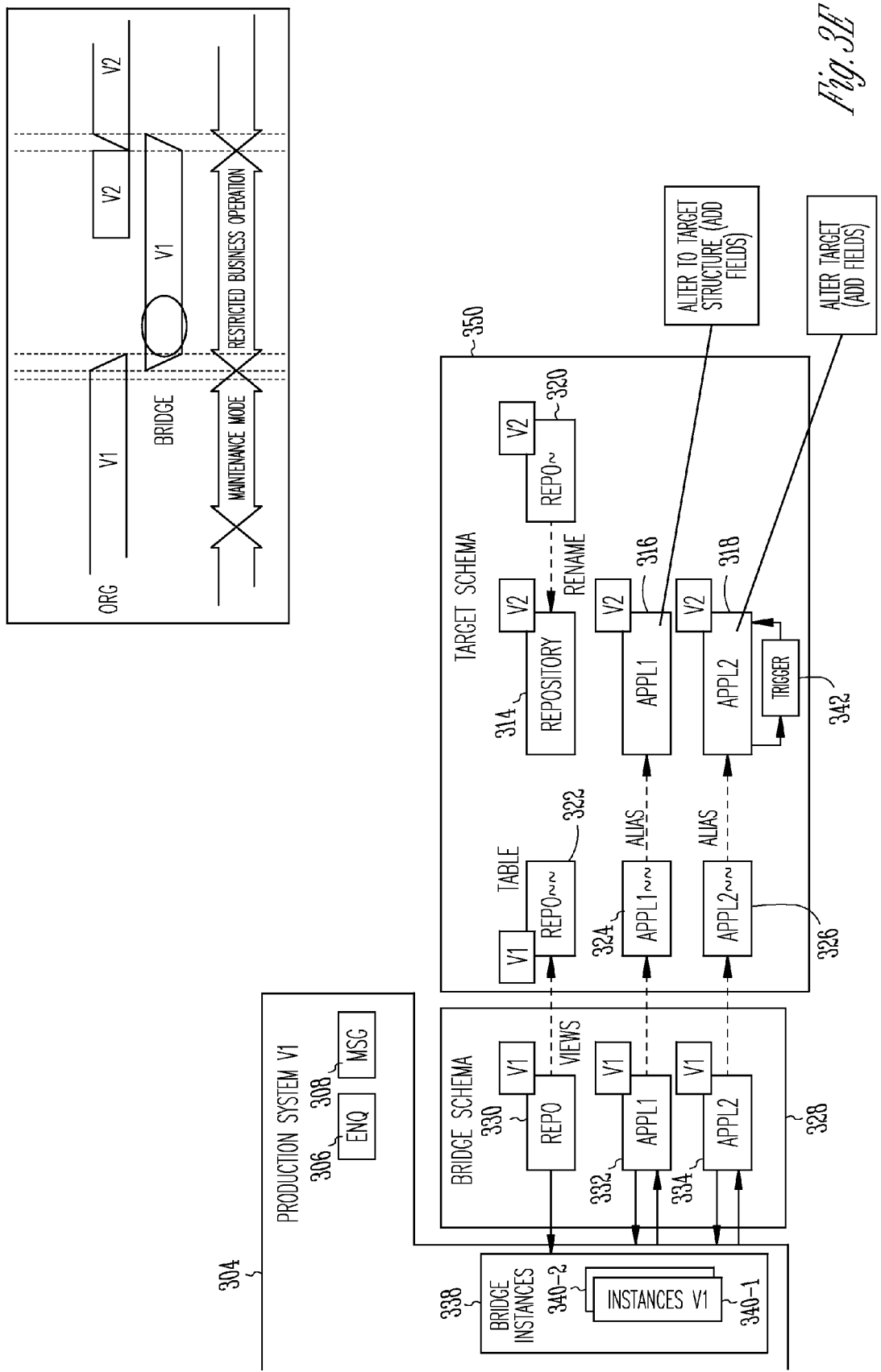
FIG. 3E illustrates the logical diagram of FIG. 3D with the incorporation of the tables of the target schema, in accordance with an example embodiment.
Figure 3H:
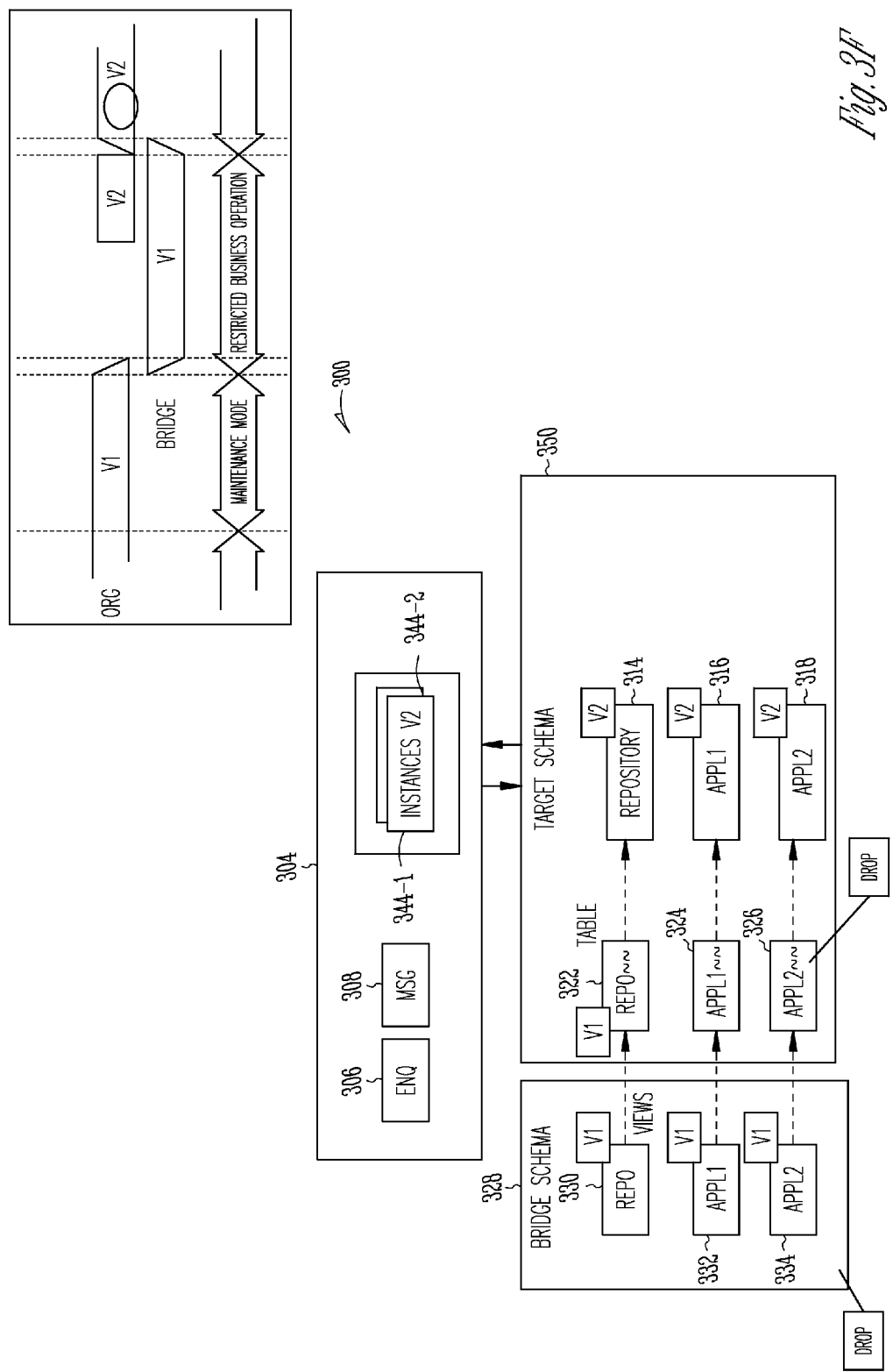
FIG. 3F illustrates the logical diagram of FIG. 3E after the incorporation of the version 2 application server instances of the production system, in accordance with an example embodiment.
FIG. 3G illustrates the logical diagram of FIG. 3F after the software upgrade of the production system, in accordance with an example embodiment.

FIG. 3E illustrates the logical diagram 300 with the incorporation of the tables of the target schema 350, in accordance with an example embodiment. In one example embodiment, the repository table Repo~ 320 that corresponds to the target schema 350 is renamed to the name of the original repository table 314 (i.e., Repository) that corresponds to the original schema 312. The two application tables of the original schema 312, table Appl1 316 and table Appl2 318, are revised to conform to the target schema 350 (as denoted by the V2 legend). For example, the revised table Appl1 316 may have additional fields in comparison to the original table Appl1 316. Similarly, the revised table Appl2 318 may have, for example, converted fields in comparison to the original table Appl2 318.

A trigger 342 is created to copy the data from an existing field of the table Appl2 318 to a new field, as illustrated in FIG. 3E. In one example embodiment, the trigger 342 transfers the data as it is changed by the application server instances 310-1, 310-2; a batch process transfers the data which has not been changed by the application server instances 310-1, 310-2 since the addition of the corresponding new field to the table. In addition, the newly converted fields can be renamed, as described above, and new indexes can be generated, if needed.

Figure 3G:
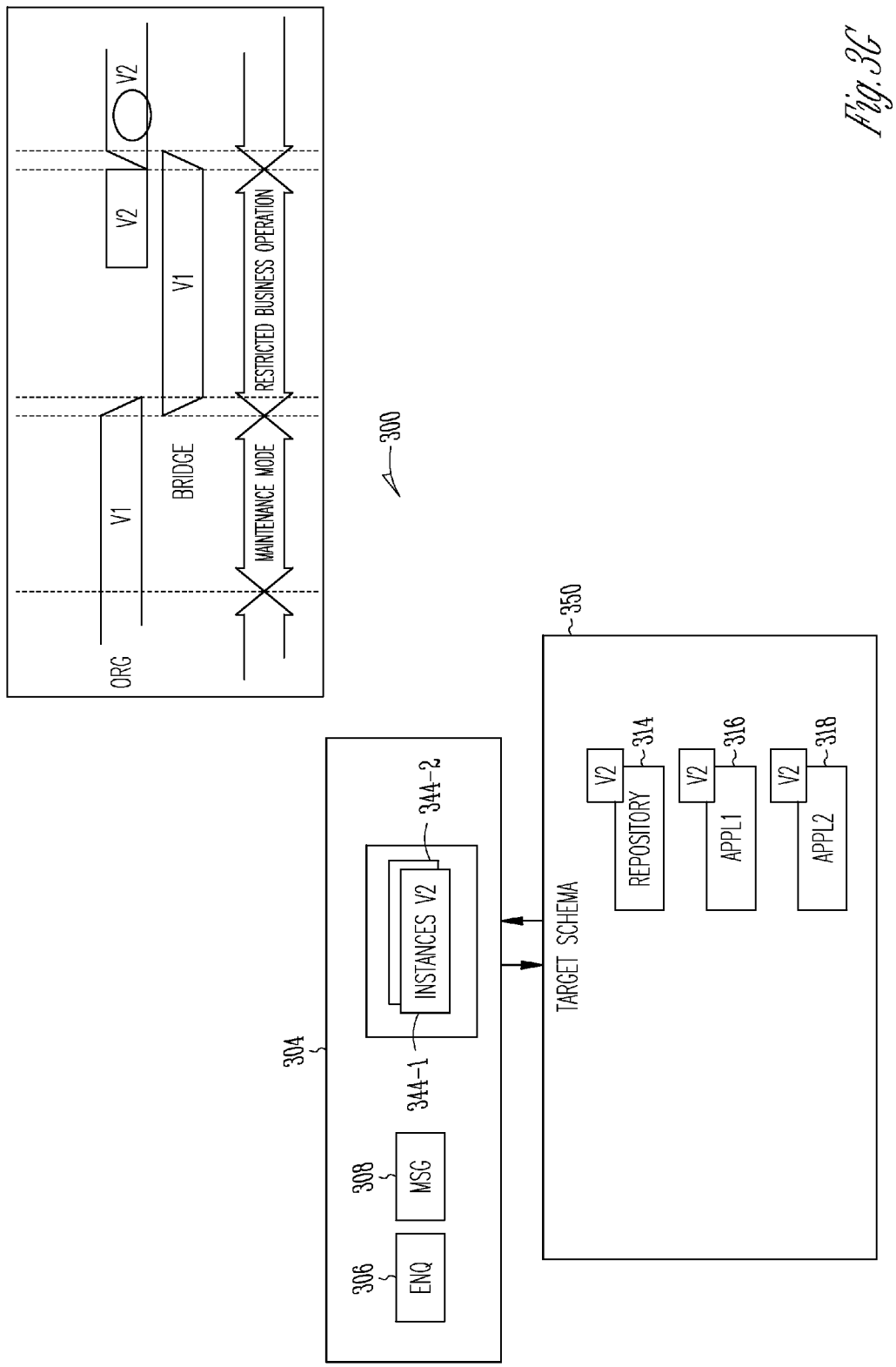

FIG. 3F illustrates the logical diagram 300 after the incorporation of the version 2 application server instances 344-1, 344-2 of the production system 304 in accordance with an example embodiment. The version 2 application server instances 344-1, 344-2 access the tables of the target schema 350, as illustrated in FIG. 3F, and thereby allow the version 2 applications of the production system 304 to utilize the converted tables. Once the applications of the production system 304 transition to using the version 2 application server instances 344-1, 344-2, the bridge schema 328, the aliases Appl1~~ 324 and Appl2~~ 326, and the repository table Repo~~ 322 may be dropped. FIG. 3G illustrates the logical diagram 300 after the software upgrade of the production system 304, in accordance with an example embodiment.

Figure 4B:
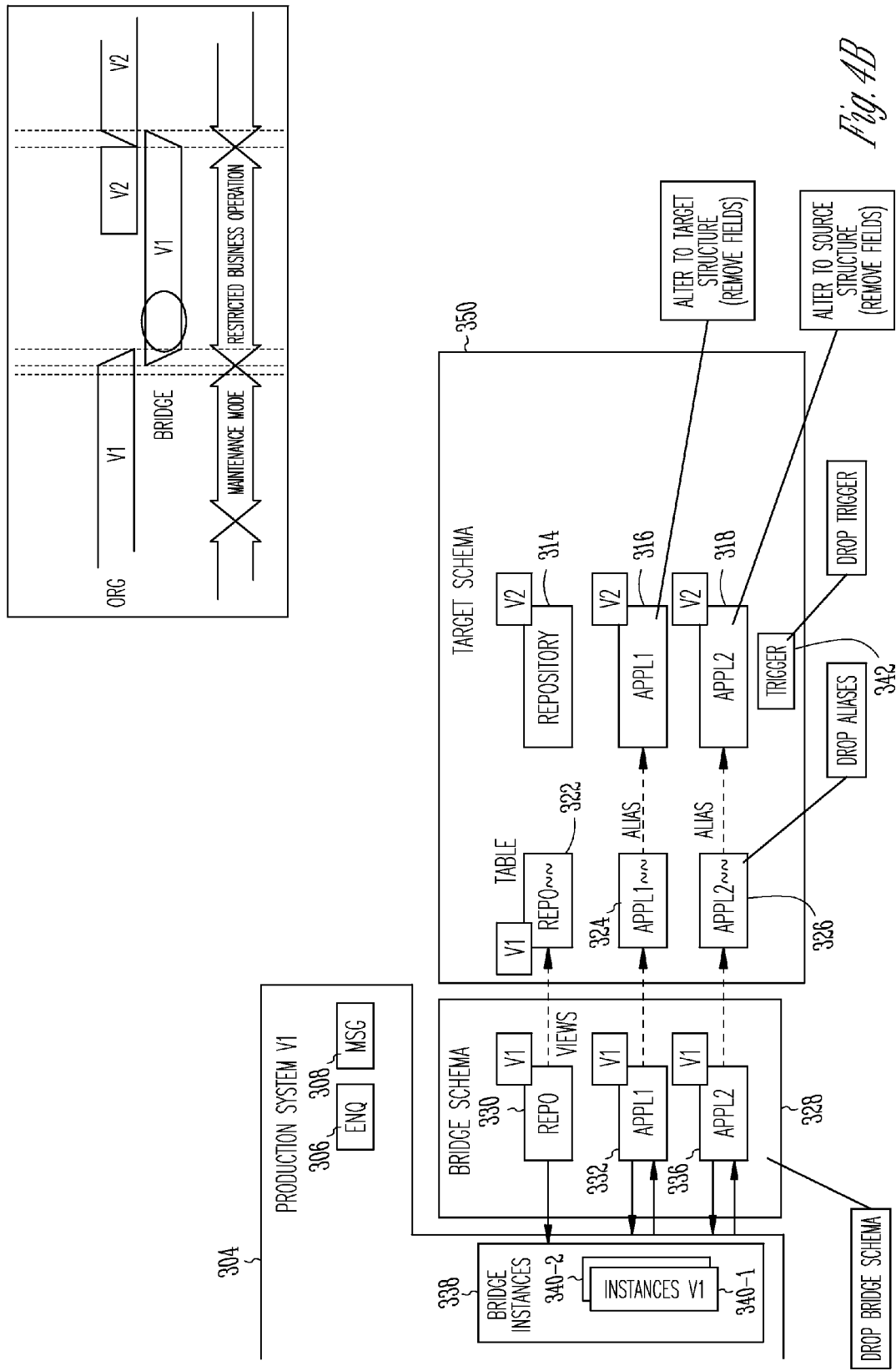
Figure 4C:
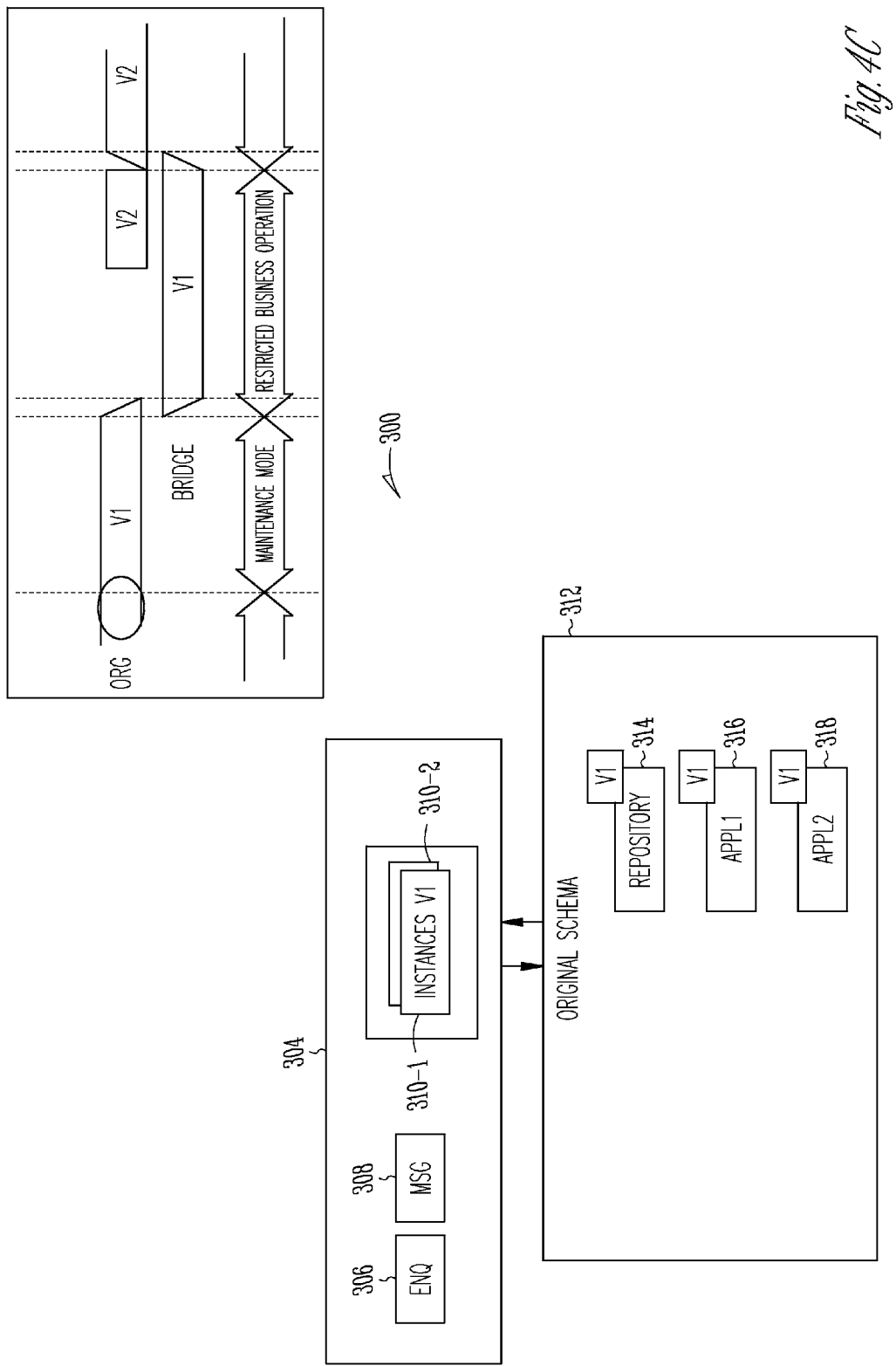

In some instances, a failure may occur during the software upgrade or migration process. For example, duplicate field names or failure to get an exclusive lock on a table may result in a failure of the upgrade process. In this case, it may be necessary to roll-back the table conversion process. FIGS. 4A-4D illustrate the logical diagram 300 of the production system 304 during a rollback procedure, in accordance with an example embodiment. FIG. 4A illustrates an example state of the production system 304 when a failure may occur, in accordance with an example embodiment. In the example of FIG. 4A, the trigger 342 has been created and the copying of the data is underway. In case of failure, the trigger 342 can be dropped and the new fields that were added to the tables (i.e., table Appl1 316 and table Appl2 318) are removed, as illustrated in FIG. 4B. The bridge schema 328, the aliases Appl1~~ 324 and Appl2~~ 326, and the repository table 314 may be dropped (and be replaced by the version 1 repository table 314 of the original schema 312). FIG. 4C illustrates the logical diagram 300 after the roll-back of the software upgrade or migration of the production system 304, in accordance with an example embodiment.

Figure 5:
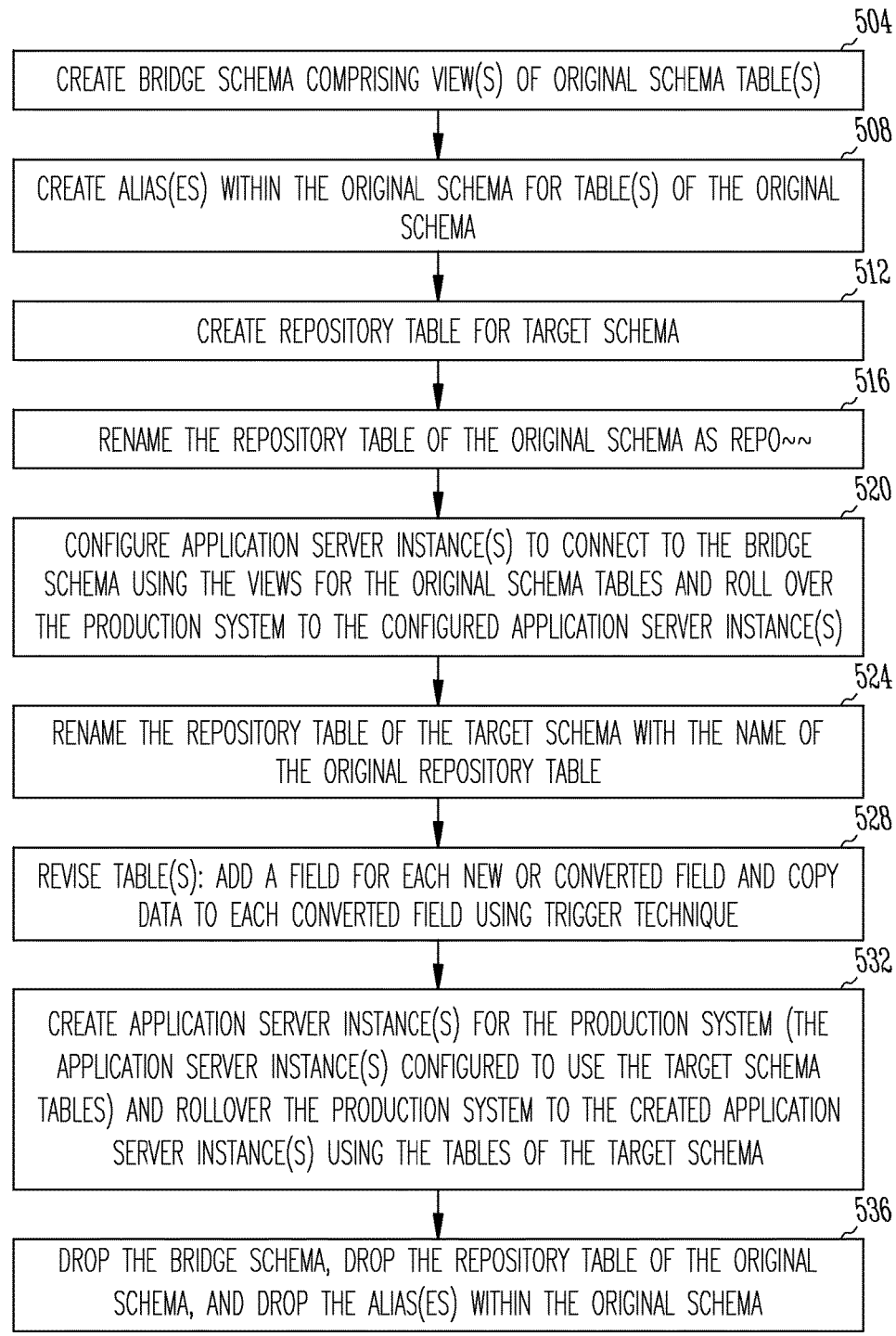
FIG. 5 is a flowchart of an example method for upgrading software that utilizes a database table, in accordance with an example embodiment.

FIG. 5 is a flowchart of an example method 500 for upgrading software that utilizes a database table, in accordance with an example embodiment. In one example embodiment, one or more of the operations of the method 500 are performed by the table conversion module 906.

In one example embodiment, the bridge schema 328 is created (operation 504). As illustrated in FIG. 3B, the bridge schema 328 comprises a view for each table of the original schema. For example, the bridge schema 328 comprises a view Repo 330, a view Appl1 332, and a view Appl2 334. Aliases are created within the original schema 312 for the table(s) of the original schema 312 (operation 508). As noted above, the views of the bridge schema 328 access the tables of the original schema 312 via the aliases within the original schema 312. The aliases include Repo~~ 322 for accessing the repository table 314, Appl1~~ 324 for accessing the table Appl1 316, and Appl2~~ for accessing table Appl2 318. In addition, a new repository table Repo~~ 320 that corresponds to the target schema 350 is created (operation 512). The alias Repo~~ 322 may be dropped and the repository table 314 of the original schema 312 is renamed with the name of the dropped alias (i.e., Repo~~) (operation 516), as illustrated in FIG. 3D.

The bridge application server instances 340-1, 340-2 are created within the production system 304 and are configured to utilize the bridge schema 328 in order to access the tables of the original schema 312 (operation 520). As noted above, a transaction manager moves the applications to utilize the bridge application server instances 340-1, 340-2 after a database transaction completes in order to ensure a smooth transition between the different application servers.

The repository table 320 that corresponds to the target schema 350 is renamed with the original name of the repository table 314 of the original schema 312, as illustrated in FIG. 3E (operation 524).

The tables of the original schema 312 (e.g., table Appl1 316 and table Appl2 318) are revised to conform to the target schema 350 (operation 528). For example, a trigger 342 may be created to copy the data in an existing field to a new field, as illustrated in FIG. 3E. In addition, the newly converted fields can be renamed, as described above, and new indexes may be generated, if needed. The version 2 application server instances 344-1, 344-2 are created and a rollover to the tables of the target schema 350 is performed (operation 532). The version 2 application server instances 344-1, 344-2 are configured to access the tables of the target schema 350, as illustrated in FIG. 3F. The bridge schema 328, the aliases (e.g., aliases Appl1~~ 324 and Appl2~~ 326), and the repository table (Repo~~ 322) are dropped (operation 536). The transition to the target schema 350 is complete, as illustrated in FIG. 3G.

Figure 6:
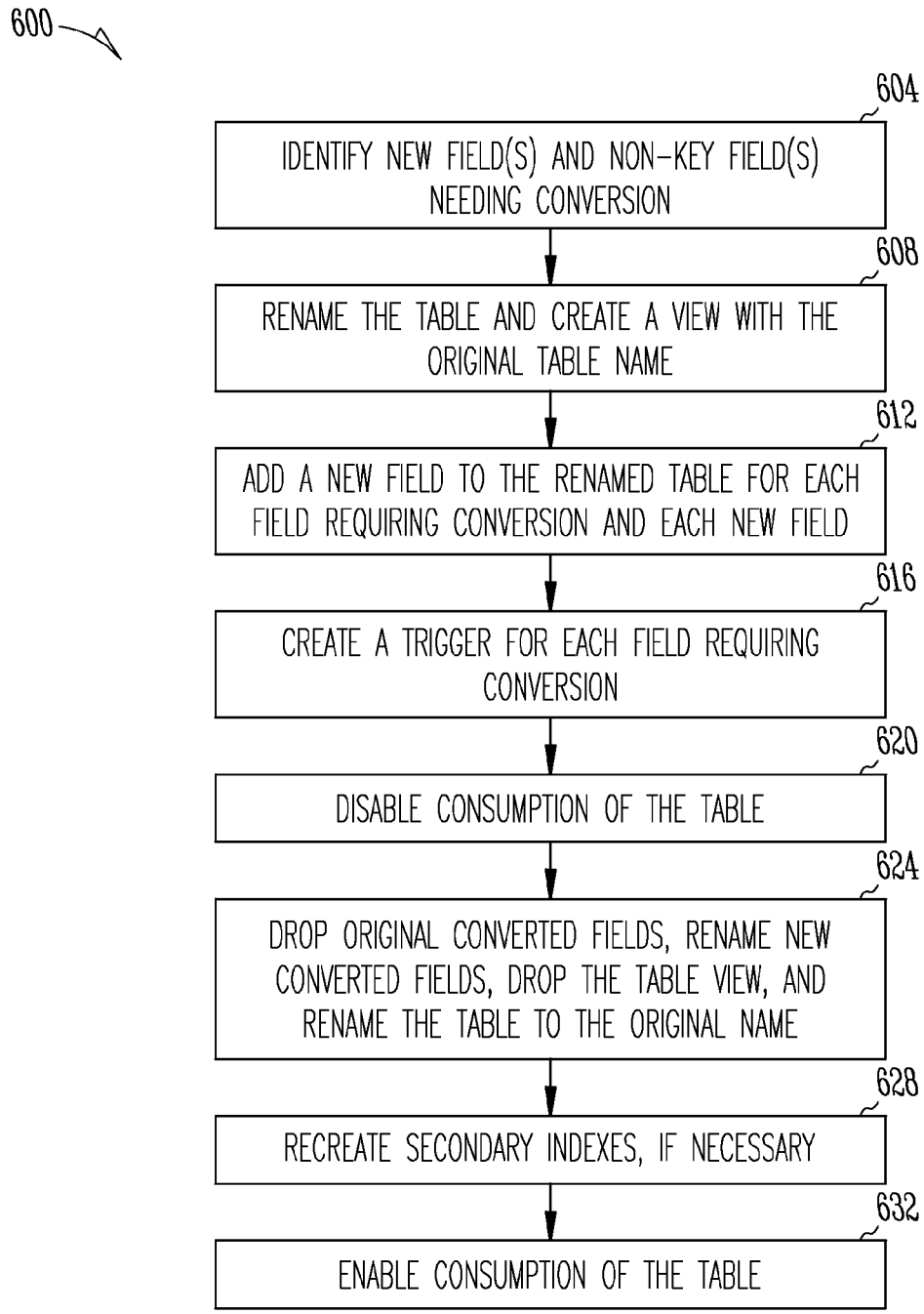
FIG. 6 is a flowchart of an example method for converting a non-key field of a table, in accordance with an example embodiment.

FIG. 6 is a flowchart of an example method 600 for converting a non-key field of a table, in accordance with an example embodiment. In one example embodiment, one or more of the operations of the method 600 are performed by the table conversion module 906.

In one example embodiment, a structure of a new table, i.e. the table of a target schema 350 to be converted to, is analyzed and non-key fields that need to be converted are identified (operation 604). For example, an existing table may have fields K1, F1, and F2, where K1 is a key field and F2 is character data type "NUMC" of six-digit length. If the new table has identical fields to the existing table except for an additional field F3 and for Field F2 having a length of ten digits, then field F2 would be identified as needing conversion to a length of ten digits and field F3 would be identified as needing to be added.

The existing table is renamed (for example, to Table_temp) and a view Table is created with the name of the original table (e.g., Table1) where all fields of the table are selected in the list of fields (operation 608). For example, all fields of Table1 are selected by explicitly specifying the fields in the list of fields (e.g., create view Table as select K1, F1, F2 from Table_temp). The view is part of the table link of the database system 104. If supported, this step is performed in one database transaction. If access to the table results in, for example, an SQL error indicating that the table does not exist, the access should be retried.

A new field is then appended to the temporarily named table (i.e., Table_temp) for each field identified as being in need of conversion and for each additional field, where the new field is of the type defined in the new table (operation 612). The fields that are appended for the fields in need of conversion are given temporary names. For example, the new field appended for field F2 is named F2_Tmp. New fields that are appended for additional fields are given their target name, such as field F3.

A trigger 342 is created for each field in need of conversion in order to update the corresponding new field (operation 616). In one example embodiment, the trigger 342 is created for the table and does the conversion of all fields. Depending on the type of database, different triggers may be used for insert and update statements. The trigger 342 performs the content conversion, copying data from, for example, field F2 to field F2_Tmp and converting the data from data type NUMC 6 to data type NUMC 10. In one example embodiment, a database procedure is called to copy the data of the field F2 (that has not changed since the creation of the corresponding new field) to the field F2_Tmp.

The consumption of the table, if enabled, is disabled (operation 620). The old field(s), such as F2, are dropped (by, for example, performing the operation alter table drop column F2); the new converted field(s) are renamed, such as renaming field F2_Tmp as F2, (by, for example, performing the operation alter table rename column F2_Tmp to F2); the view Table is dropped; and the table Table_Tmp is renamed to the original name of the table (by, for example, performing the operation rename table Table_Tmp to Table) (operation 624). Secondary indexes are recreated using the converted fields, if necessary (operation 628). The conversion of the table is complete and the consumption of the table is enabled (operation 632).

Figure 7:
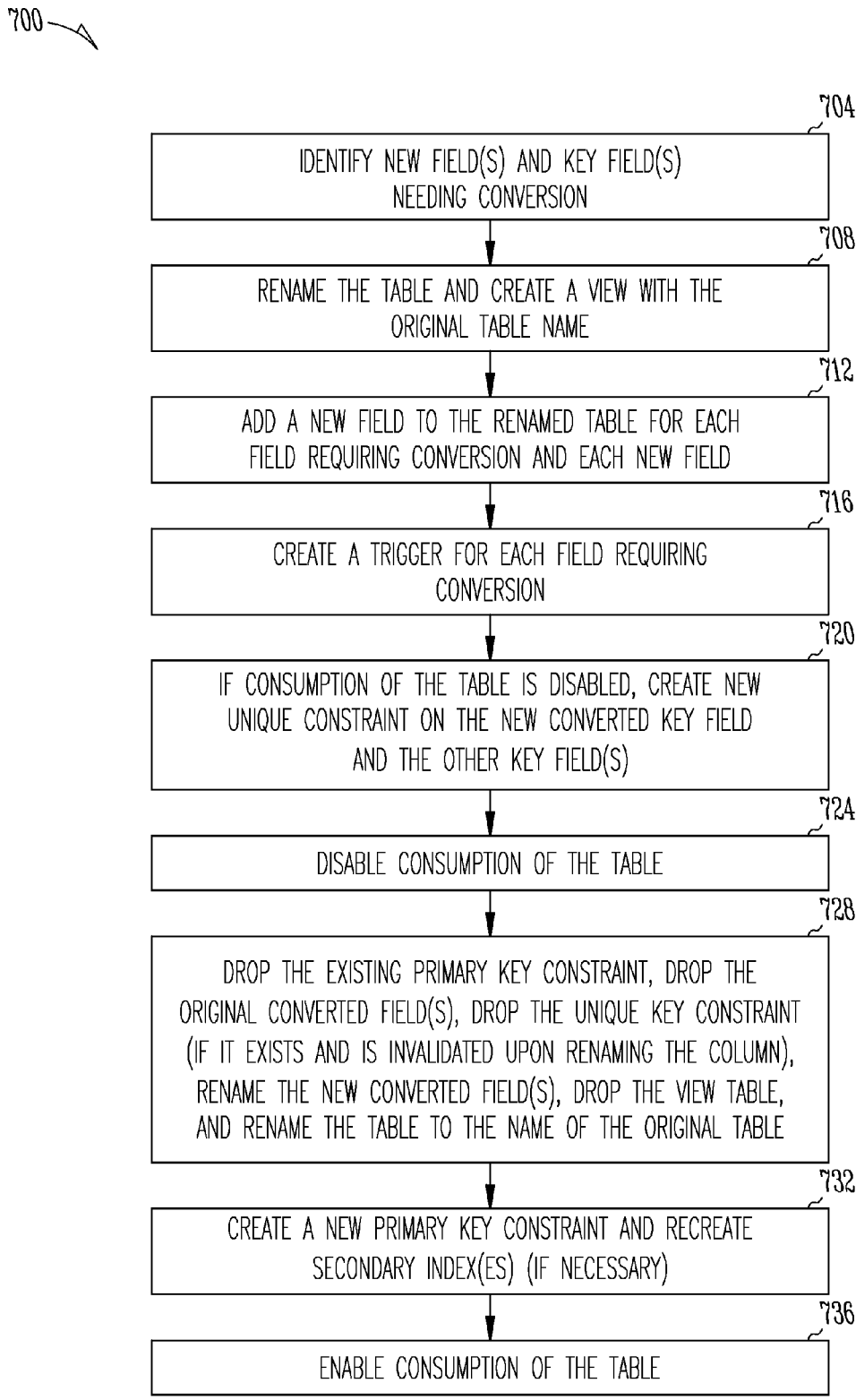
FIG. 7 is a flowchart of a first example method for converting a key field of a table, in accordance with an example embodiment.

FIG. 7 is a flowchart of a first example method 700 for converting a key field of a table, in accordance with an example embodiment. In one example embodiment, one or more of the operations of the method 700 are performed by the table conversion module 906.

In one example embodiment, a structure of a new table, i.e. the table to be converted to, is analyzed and additional fields and/or fields which need to be converted are identified (operation 704). For example, an existing table may have fields K1, K2, F1, and F2, where K1 and K2 are key fields and K1 is of character data type "NUMC" and has a length of six characters. If the new table has identical fields to the existing table except for an additional field F3 and for field F2 having a length of ten characters (instead of six characters), then field F2 would be identified as needing conversion to a length of ten characters and field F3 would be identified as needing to be added.

The existing table is renamed to, for example, Table_Temp and a view Table is created with the name of the original table (e.g., Table1) (operation 708). In one example embodiment, all fields of Table1 are selected by explicitly specifying fields of the temporarily named table in the list of fields (e.g., create view Table as select K1, K2, F1, and F2). The created view is part of the table link of the database system 104. In one example embodiment, operation 708 is performed in one transaction. If access to the table results in, for example, an SQL error indicating that the table does not exist, the access may be retried. In one example embodiment, the retry can be performed by the database interface in the application server. In this way, the temporary lack of availability of the table is hidden from the consumer of the application.

A new field is then appended to the temporarily named table (Table_temp) for each field identified as being in need of conversion and for each new additional field, where the new field is of the type defined in the new table (operation 712). The fields that are appended for the fields in need of conversion are given temporary names. For example, the new field appended for key field K1 is named K1_Temp. New fields that are to be appended for additional fields are given their target name, such as field F3. Also, since K1 is a key field, the temporary field K1_Temp is appended as a "nullable" field and, as a non-key field, a standard data field. The append done as "nullable" is a fast database operation; this is necessary, as this type of database operation uses an exclusive lock on the table and the impact on the use of the table should be minimized. The field is later altered to exhibit the default behavior, as needed by the application.

A trigger 342 is created for each field in need of conversion (operation 716). The trigger 342 is used to update the new field (K1_Temp) that is being converted to. The trigger 342 performs the content conversion, copying data from field K1 to field K1_Temp, and, for example, converting the data from data type NUMC 6 to data type NUMC 10. In one example embodiment, the copying is performed by the database trigger within the same database transaction as updates to the row containing the data for the original corresponding field and within the same database transaction as inserts of new rows. In one example embodiment, a database procedure is called to copy the data from all entries of the field K1 (that have not changed since the creation of the corresponding new field) to the new field (K1_Temp). The trigger 342 remains in place, thereby keeping the data consistent between field K1 and field K1_Temp (as updates to the data are performed and inserts of new rows are performed). For a deletion of a row, the trigger does not need to perform any action, as the row including the new field(s) is deleted.

The temporary and new fields are appended as "nullable" to enable adding the fields during use of the table with minimal impact for the users of the table. The fields have to be set to their desired default value before the switch can be performed. The fields thus have to be set to "not null, default <some default, e.g. space>". If the database type used can execute the alter table statement (e.g., alter table TAB alter column COL default DEFAULT_VAL NOT NULL) with minimum impact for the consumer of the table, this operation can be done during uptime of the table (i.e., while the table is accessible by, for example, an application). If the runtime of the statement depends on the database size, the table downtime starts before the statement is executed. If the table is in use and the alter statement is fast, the new unique constraint can be added (including the target column K1_TEMP). Again, if this statement can be executed with minimum impact for the consumer of the table, this step can be executed during the uptime of the table; otherwise, the step is executed while the table is in downtime. Depending on the capabilities of the database, the unique constraint on K1_TEMP and the other keys can be used as the new primary key constraint (once K1_TEMP is renamed to K1). This would enable running the operations for key fields with minimum downtime as well.

In one example embodiment, if the table is already in downtime (i.e., access to the table is disabled), a new unique key constraint (e.g., Table_Uni_New) is created on K1_Temp and K2 (operation 720).

The consumption of the table is disabled (operation 724). The existing primary key constraint (e.g., Table_Uni) on K1 and K2 is dropped; the original field(s) in need of conversion, such as K1, are dropped (by, for example, performing the operation alter table drop column K1); the unique key constraint (i.e., Table_Uni_New) is dropped (assuming the unique key constraint exists and is invalidated upon renaming the column); the new converted field(s) are renamed, such as renaming field K1_Temp as K1 (by, for example, performing the operation alter table rename column K1_Temp to K1); the view Table is dropped; and the table is renamed to the name of the original table (by, for example, performing the operation rename table Table_Temp to Table) (operation 728). A new primary key constraint for K1 and K2 (e.g., Table_Uni) is created and secondary indexes are recreated, if necessary (operation 732). The conversion of the table is complete and the consumption of the table is enabled (operation 736).

Figure 8:
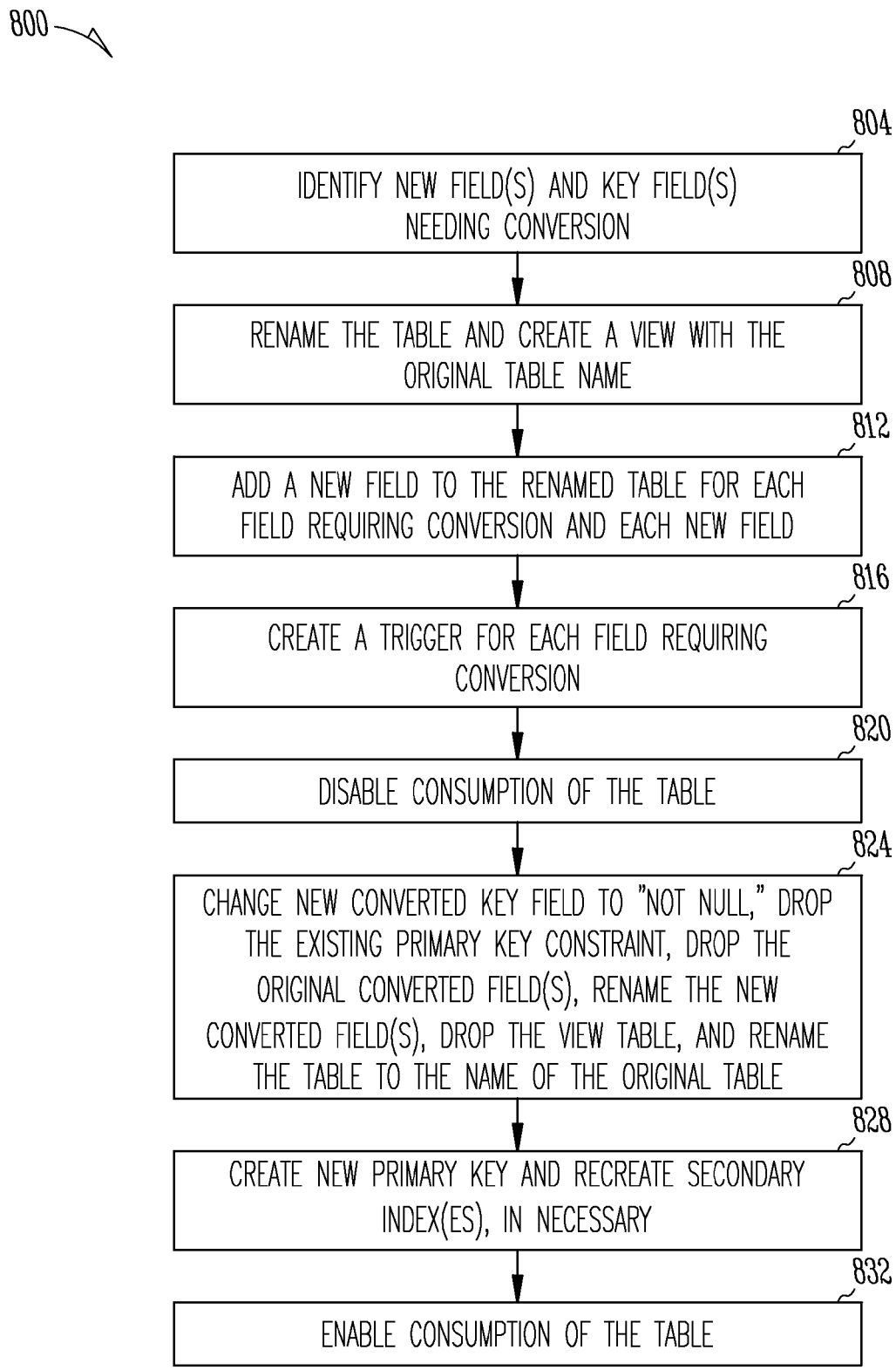
FIG. 8 is a flowchart of a second example method for converting a key field of a table, in accordance with an example embodiment.

FIG. 8 is a flowchart of a second example method 800 for converting a key field of a table, in accordance with an example embodiment. In one example embodiment, one or more of the operations of the method 800 are performed by the table conversion module 906.

In one example embodiment, a structure of a new table, i.e. the table to be converted to, is analyzed and additional fields and/or fields which need to be converted are identified (operation 804). For example, an existing table may have fields K1, K2, F1, and F2, where K1 and K2 are key fields and K1 is of character data type "NUMC" and has a length of six characters. If the new table has identical fields to the existing table except for an additional field F3 and for field F2 having a length of ten characters (instead of six characters), then field F2 would be identified as needing conversion to a length of ten characters and field F3 would be identified as needing to be added.

The existing table is renamed to, for example, Table_Temp and a view Table is created with the name of the original table (e.g., Table1) (operation 808). In one example embodiment, all fields of Table1 are selected by explicitly specifying fields of the temporarily named table in the list of fields (e.g., create view Table as select K1, K2, F1, F2). The created view is part of the table link of the database system 104. In one example embodiment, operation 808 is performed in one transaction. If access to the table results in, for example, an SQL error indicating that the table does not exist, the access may be retried.

A new field is then appended to the temporarily named table (Table_temp) for each field identified as being in need of conversion and for each new additional field, where the new field is of the type defined in the new table (operation 812). The fields that are appended for the fields in need of conversion are given temporary names. For example, the new field appended for field K1 is named K1_Temp. New fields that are appended for additional fields are given their target name, such as field F3. Also, since K1 is a key field, the temporary field K1_Temp is appended as a "nullable" field.

A trigger 342 is created for each field in need of conversion (operation 816). The trigger 342 is used to update the new field (K1_Temp) that is being converted. The trigger 342 performs the content conversion, copying data from, for example, field K1 to field K1_Temp, and converting the data from data type NUMC 6 to data type NUMC 10. In one example embodiment, the copying is performed within the same database transaction as updates to and inserts of the row containing the data for the original corresponding field. In one example embodiment, a database procedure is called to copy the data from all entries of the field K1 that have not changed since the creation of the corresponding field to the new field (K1_Temp). The trigger 342 remains in place, thereby keeping the data consistent between field K1 and field K1_Temp (as updates to the data are performed).

The consumption of the table, if enabled, is disabled (operation 820). The new converted key field (e.g., column K1_Temp) is changed to "not null" (by, for example, performing the operation alter column K1_Temp to "not null"). The existing primary key constraint (e.g., Table_Uni) on K1 and K2 is dropped; the original converted field(s), such as K1, are dropped (by, for example, performing the operation alter table drop column K1); the new field(s) are renamed, such as renaming field K1_Temp as K1 (by, for example, performing the operation alter table rename column K1_Temp to K1); the view Table is dropped, and the table is renamed to the name of the original table (by, for example, performing the operation rename table Table_Temp to Table) (operation 824). A new primary key constraint for K1 and K2 (e.g., Table_Uni) is created and secondary indexes are recreated, if necessary (operation 828). The conversion of the table is complete and the consumption of the table is enabled (operation 832).

Figure 9:
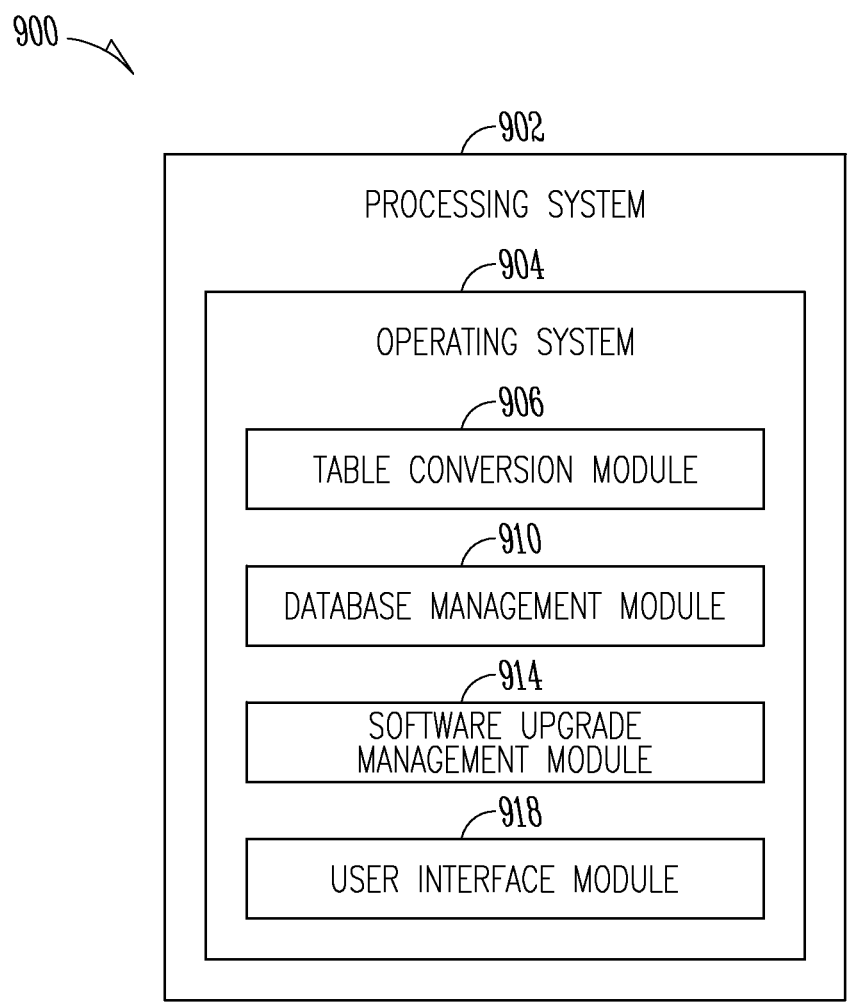
FIG. 9 is a block diagram of an example database system for revising tables and performing a software upgrade and/or migration, in accordance an example embodiment.

FIG. 9 is a block diagram 900 of an example database system 104 for revising tables and performing a software upgrade and/or migration, in accordance an example embodiment. The database system 104 is shown to include a processing system 902 that may be implemented on a server, client, or other processing device that includes an operating system 904 for executing software instructions. In accordance with an example embodiment, the database system 104 includes a table conversion module 906, a database management module 910, a software upgrade management module 914, and a user interface module 918.

The table conversion module 906 manages the conversion of a database table. The table conversion module 906 manages the conversion of fields of the table and the addition of new fields, as needed. The table conversion module 906 instantiates triggers 342 to copy data between fields and handles the renaming of tables and fields. The table conversion module 906 participates in a conversion rollback if a failure is encountered during the conversion process.

The database management module 910 provides for the capture, maintenance, querying, and analysis of data stored in the database system 104. The database management module 910 is based on a database model, such as a relational model. The software upgrade management module 914 manages the creation of the bridge schema 328, the aliases 322, 324, 326, and the repository tables 314, 320. The software upgrade management module 914 also manages the conversion rollback, if a failure is encountered during the conversion process. The user interface module 918 enables a user, such as an administrator, developer, and the like, to initiate a software upgrade and/or migration and to monitor the upgrade or migration process, as described above.

Figure 10:
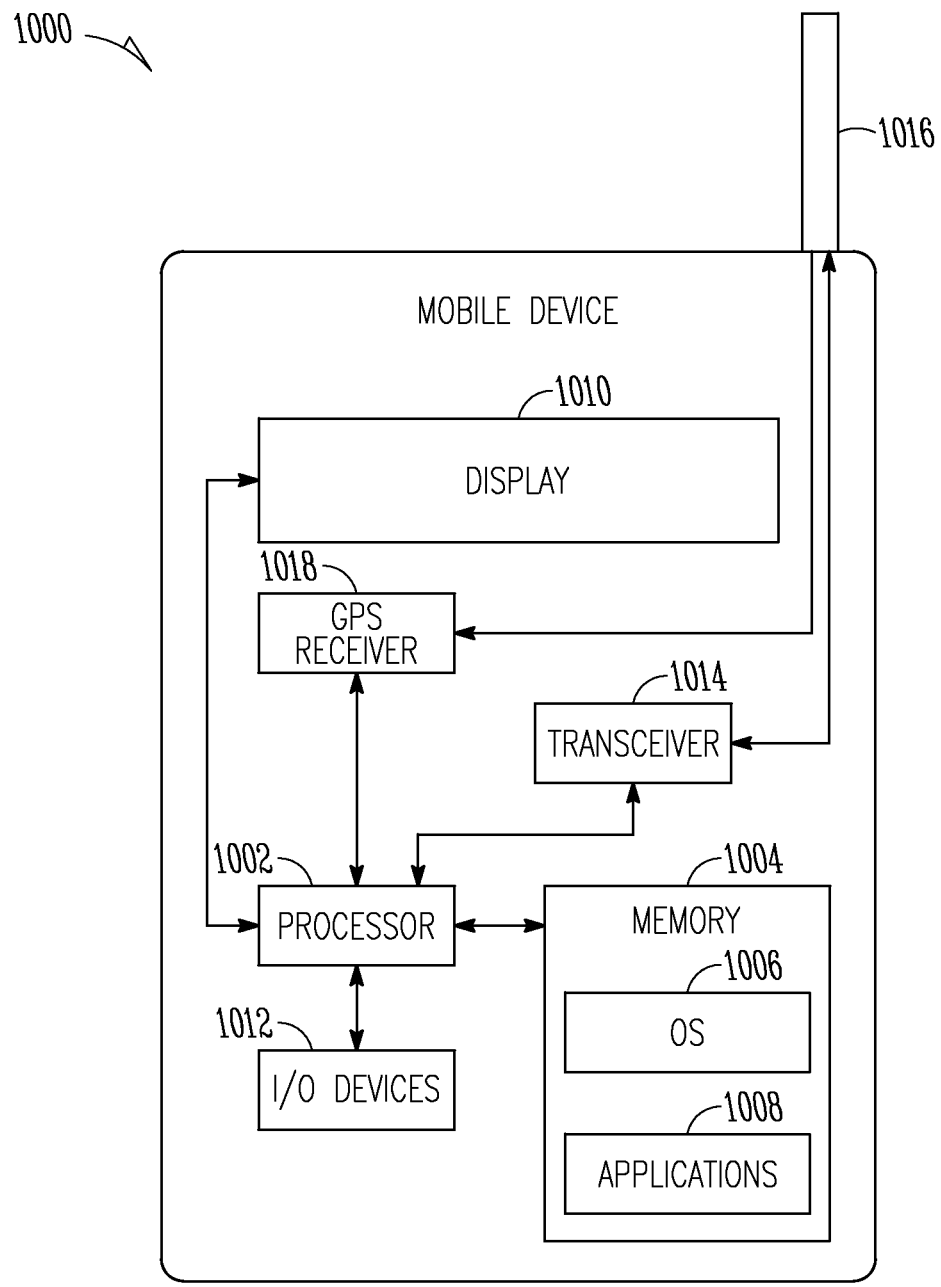
FIG. 10 is a block diagram illustrating a mobile device, according to an example embodiment.

FIG. 10 is a block diagram illustrating a mobile device 1000, according to an example embodiment. The mobile device 1000 can include a processor 1002. The processor 1002 can be any of a variety of different types of commercially available processors suitable for mobile devices 1000 (for example, an XScale architecture microprocessor, a Microprocessor without Interlocked Pipeline Stages (MIPS) architecture processor, or another type of processor). A memory 1004, such as a random access memory (RAM), a Flash memory, or other type of memory, is typically accessible to the processor 1002. The memory 1004 can be adapted to store an operating system (OS) 1006, as well as applications 1008, such as a mobile location enabled application that can provide location-based services (LBSs) to a user. The processor 1002 can be coupled, either directly or via appropriate intermediary hardware, to a display 1010 and to one or more input/output (I/O) devices 1012, such as a keypad, a touch panel sensor, and a microphone. Similarly, in some embodiments, the processor 1002 can be coupled to a transceiver 1014 that interfaces with an antenna 1016. The transceiver 1014 can be configured to both transmit and receive cellular network signals, wireless data signals, or other types of signals via the antenna 1016, depending on the nature of the mobile device 1000. Further, in some configurations, a GPS receiver 1018 can also make use of the antenna 1016 to receive GPS signals.

Figure 11:
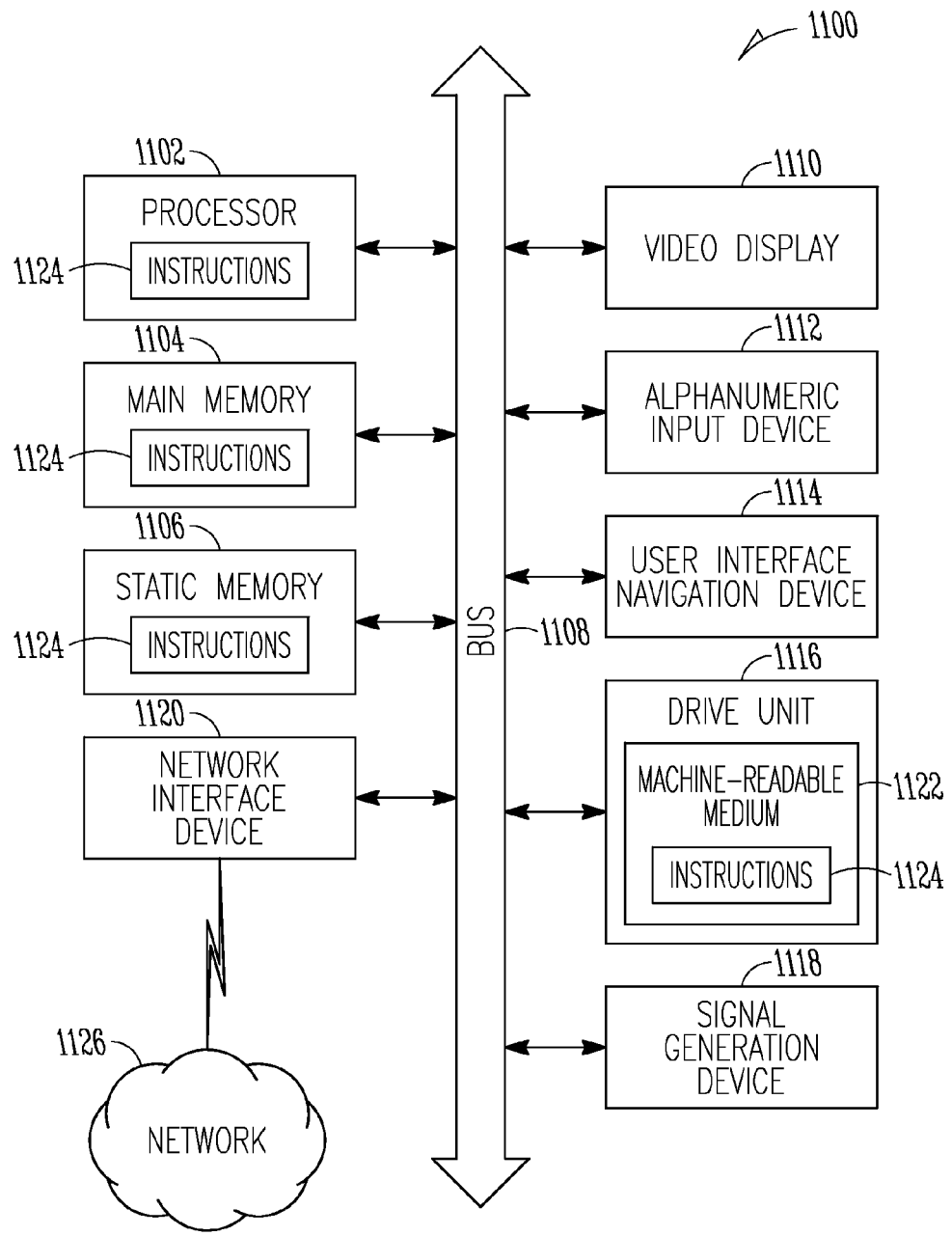
FIG. 11 is a block diagram of a computer processing system within which a set of instructions, for causing the computer to perform any one or more of the methodologies discussed herein, may be executed.

FIG. 11 is a block diagram of a computer processing system 1100 within which a set of instructions 1124 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a set-top box (STB), a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1100 includes a processor 1102 (e.g., a central processing unit (CPU), a graphics processing unit (GPU), or both), a main memory 1104, and a static memory 1106, which communicate with each other via a bus 1108. The computer processing system 1100 may further include a video display 1110 (e.g., a plasma display, a liquid crystal display (LCD), or a cathode ray tube (CRT)). The computer processing system 1100 also includes an alphanumeric input device 1112 (e.g., a keyboard), a user interface (UI) navigation device 1114 (e.g., a mouse and/or touch screen), a drive unit 1116, a signal generation device 1118 (e.g., a speaker), and a network interface device 1120.

The drive unit 1116 includes a machine-readable medium 1122 on which is stored one or more sets of instructions 1124 and data structures embodying or utilized by any one or more of the methodologies or functions described herein. The instructions 1124 may also reside, completely or at least partially, within the main memory 1104, the static memory 1106, and/or within the processor 1102 during execution thereof by the computer processing system 1100, the main memory 1104, the static memory 1106, and the processor 1102 also constituting tangible machine-readable media 1122.

The instructions 1124 may further be transmitted or received over a network 1126 via the network interface device 1120 utilizing any one of a number of well-known transfer protocols (e.g., Hypertext Transfer Protocol).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding, or carrying a set of instructions 1124 for execution by the computer and that cause the computer to perform any one or more of the methodologies of the present application, or that is capable of storing, encoding, or carrying data structures utilized by or associated with such a set of instructions 1124. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method for performing an upgrade, the method comprising:
creating a bridge schema comprising a bridge view in the bridge schema for a table of an original schema, wherein a first field of the table is of a first data type in the original schema, and wherein the first field is of a second data type in a target schema;
adding to the table a revised first field having the second data type, wherein the bridge view accesses the first field and does not access the revised first field;
creating a bridge application server instance, the bridge application server instance configured to utilize the bridge schema containing the bridge view to access the table;
copying data from the first field to the revised first field, wherein the copying comprises modifying the data from the first field from the first data type to the second data type;
deleting the first field;
renaming the revised first field to a name of the first field; and
creating a target application server instance configured to access the table.

2. The computerized method of claim 1, further comprising creating an alias for the table, the alias being the target of the bridge view in the bridge schema, the bridge view being defined to select from the alias of the table.

3. The computerized method of claim 2, further comprising dropping the alias for the table of the original schema.

4. The computerized method of claim 1, further comprising configuring an application running in the application server instance to access the bridge schema and the view in the bridge schema.

5. The computerized method of claim 4, wherein only fields of the table conforming to the original schema are accessible to the application via the bridge application server instance.

6. The computerized method of claim 4, further comprising configuring the application to execute in the target application server instance.

7. The computerized method of claim 6, wherein fields of the table conforming to the target schema are accessible to the application executing in the target application server instance.

8. The computerized method of claim 1, further comprising creating a target repository table that corresponds to the target schema.

9. The computerized method of claim 8, further comprising dropping an alias for a source repository table of the original schema, the source repository table having a name, and renaming the source repository table to the name of the dropped alias for the source repository table.

10. The computerized method of claim 9, further comprising renaming the target repository table that corresponds to the target schema to the name of the source repository table of the original schema.

11. The computerized method of claim 1, further comprising dropping the bridge schema.

12. An apparatus for performing an upgrade, the apparatus comprising:
one or more hardware processors;
memory to store instructions that, when executed by the one or more hardware processors perform operations comprising:
creating a bridge schema comprising a bridge view in the bridge schema for a table of the original schema, wherein a first field of the table is of a first data type in an original schema, and wherein the first field is of a second data type in a target schema;
adding to the table a revised first field having the second data type, wherein the bridge view accesses the first field and does not access the revised first field;
creating a bridge application server instance, the bridge application server instance configured to utilize the bridge schema to access the table;
copying data from the first field to the revised first field, wherein the copying comprises modifying the data from the first field from the first data type to the second data type;
deleting the first field;
renaming the revised first field to a name of the first field; and
creating a target application server instance configured to access the table.

13. The apparatus of claim 12, further comprising instructions that, when executed by the processor cause the processor to create an alias for the table of the original schema.

14. The apparatus of claim 13, further comprising instructions that, when executed by the processor cause the processor to drop the alias for the table of the original schema.

15. The apparatus of claim 12, further comprising instructions that, when executed by the processor cause the processor to configure an application to access the bridge application server instance.

16. The apparatus of claim 15, wherein only fields of the table conforming to the original schema are accessible to the application via the bridge application server instance.

17. The apparatus of claim 15, further comprising instructions that, when executed by the processor cause the processor to configure the application to execute in the target application server instance.

18. The apparatus of claim 17, wherein fields of the table conforming to the target schema are accessible to the application executing in the target application server instance.

19. The apparatus of claim 12, further comprising instructions that, when executed by the processor cause the processor to create a target repository table that corresponds to the target schema, drop an alias for a source repository table of the original schema, the source repository table having a name, rename the source repository table to the name of the dropped alias for the source repository table, rename the target repository table that corresponds to the target schema to the name of the source repository table of the original schema, and drop the bridge schema.

20. A non-transitory computer-readable medium embodying instructions that, when executed by a processor, perform operations comprising:
creating a bridge schema comprising a bridge view for a table in a database of an original schema, wherein a first field of the table is of a first data type in the original schema, and wherein the first field is of a second data type in a target schema;

adding to the table a revised first field having the second data type, wherein the bridge view accesses the first field and does not access the revised first field;

creating a bridge application server instance, the bridge application server instance configured to utilize the bridge schema to access the table;

copying data from the first field to the revised first field, wherein the copying comprises modifying the data from the first field from the first data type to the second data type;

deleting the first field;

renaming the revised first field to a name of the first field; and creating a target application server instance configured to access the table.

* * * * *